(12) United States Patent
Kelly et al.

(10) Patent No.: US 6,485,289 B1
(45) Date of Patent: Nov. 26, 2002

(54) ULTRA REDUCED NOX BURNER SYSTEM AND PROCESS

(75) Inventors: John T. Kelly, Saratoga; Mehdi Namazian, Palo Alto, both of CA (US)

(73) Assignee: Altex Technologies Corporation, Santa Clara, CA (US)

( * ) Notice: Subject to any disclaimer, the term of this patent is extended or adjusted under 35 U.S.C. 154(b) by 0 days.

(21) Appl. No.: 09/757,288

(22) Filed: Jan. 8, 2001

Related U.S. Application Data
(60) Provisional application No. 60/175,866, filed on Jan. 12, 2000.

(51) Int. Cl.[7] .............................. F23J 15/00; F23J 7/00
(52) U.S. Cl. .............................. 431/4; 431/10; 431/12; 431/284; 110/344; 110/345
(58) Field of Search .......................... 431/4, 10, 2, 12, 431/278, 8, 284, 354, 174, 177; 110/210, 344, 345, 342; 432/14, 17, 19, 133; 60/733

(56) References Cited

U.S. PATENT DOCUMENTS

| | | | |
|---|---|---|---|
| 3,900,554 A | | 8/1975 | Lyon |
| 4,440,100 A | * | 4/1984 | Michelfelder et al. ......... 431/4 |
| 5,022,849 A | | 6/1991 | Yoshii et al. |
| 5,073,106 A | | 12/1991 | Toyonaga et al. |
| 5,257,927 A | | 11/1993 | Lang |
| 5,259,755 A | | 11/1993 | Irwin et al. |
| 5,284,438 A | | 2/1994 | McGill et al. |
| 5,368,476 A | | 11/1994 | Sugahara et al. |
| 5,407,347 A | | 4/1995 | Bortz |
| 5,460,512 A | | 10/1995 | Lifshits et al. |
| 5,542,840 A | | 8/1996 | Surbey |
| 5,603,906 A | | 2/1997 | Lang |
| 6,085,674 A | * | 7/2000 | Ashworth ................... 431/4 |
| 6,089,855 A | | 7/2000 | Becker et al. |
| 6,206,685 B1 | * | 3/2001 | Zamansky et al. ............ 431/4 |
| 6,290,492 B1 | * | 9/2001 | Li et al. ..................... 432/14 |

* cited by examiner

Primary Examiner—James C. Yeung
(74) Attorney, Agent, or Firm—Richard E. Backus

(57) ABSTRACT

A NOx reduction burner system and process. Fuel modification and fuel rich reactor zone gases are brought together with products from a fuel lean reactor zone in a low temperature burnout and NOx reduction reactor zone. The fuel modification fuel rich reactor stabilizes combustion through recirculation of hot gases to the reactants. Nitrogenous species decay reactions in the fuel rich zone controls the production of NOx. The nitrogenous species from the fuel rich zone and the NOx from the fuel lean zone then react in the burnout zone at an optimal temperature and nitrogenous species mix where NOx is minimized. Temperature in all zones, and in particular the burnout zone, can be controlled by furnace gas entrainment, induced flue gas recirculation, forced flue gas recirculation and active cooling by radiative and/or convective heat transfer. NOx can be even further reduced by introducing ammonia, or a like amine species, into the low temperature burnout zone. By balancing combustion and emissions control reactions over several zones, low emissions can be achieved under good flame stability, turndown, heat transfer and noise characteristics.

28 Claims, 20 Drawing Sheets

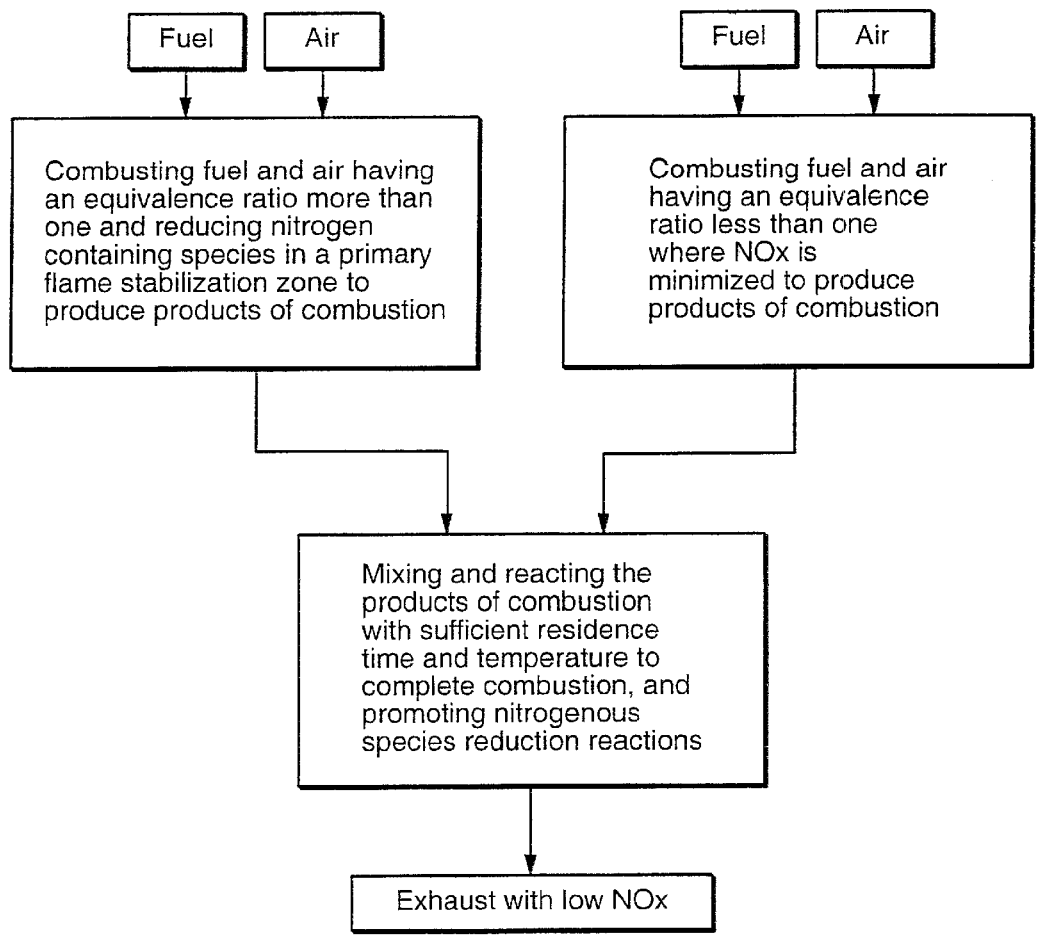
*FIG._1A*
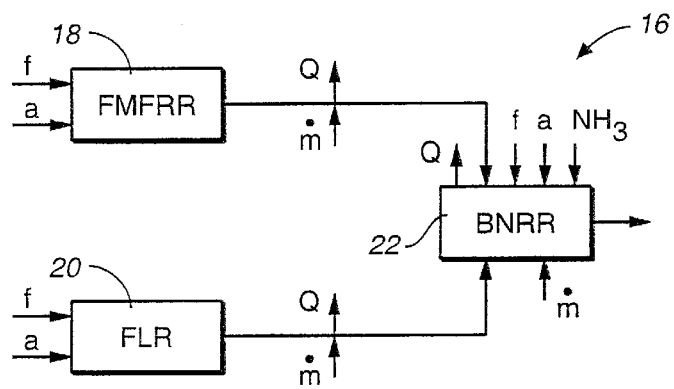
*FIG._1B*

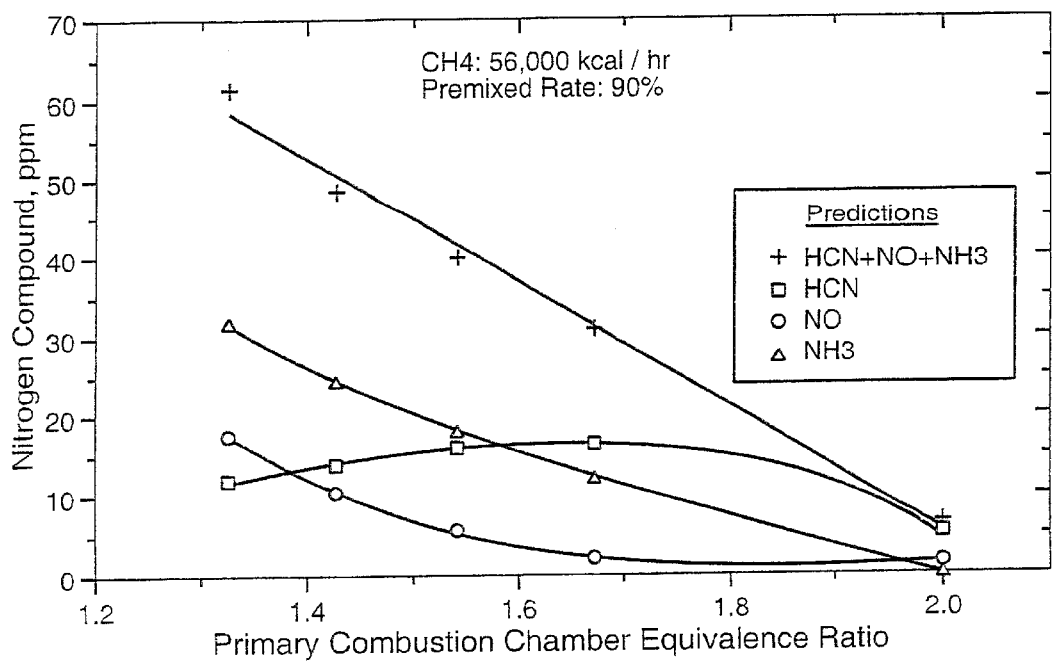
FIG._2
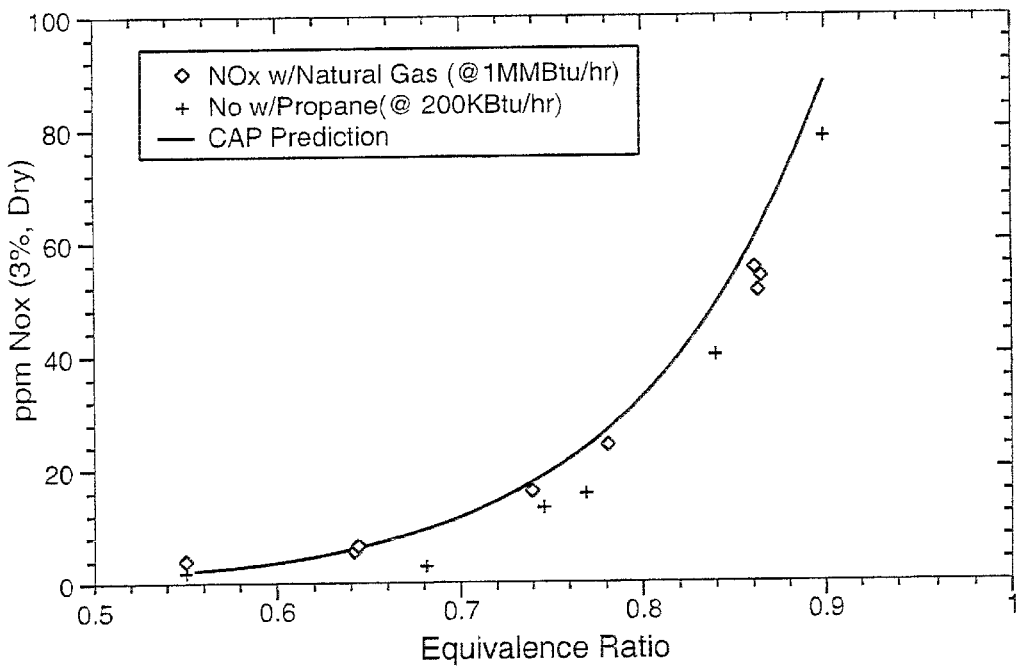
FIG._3

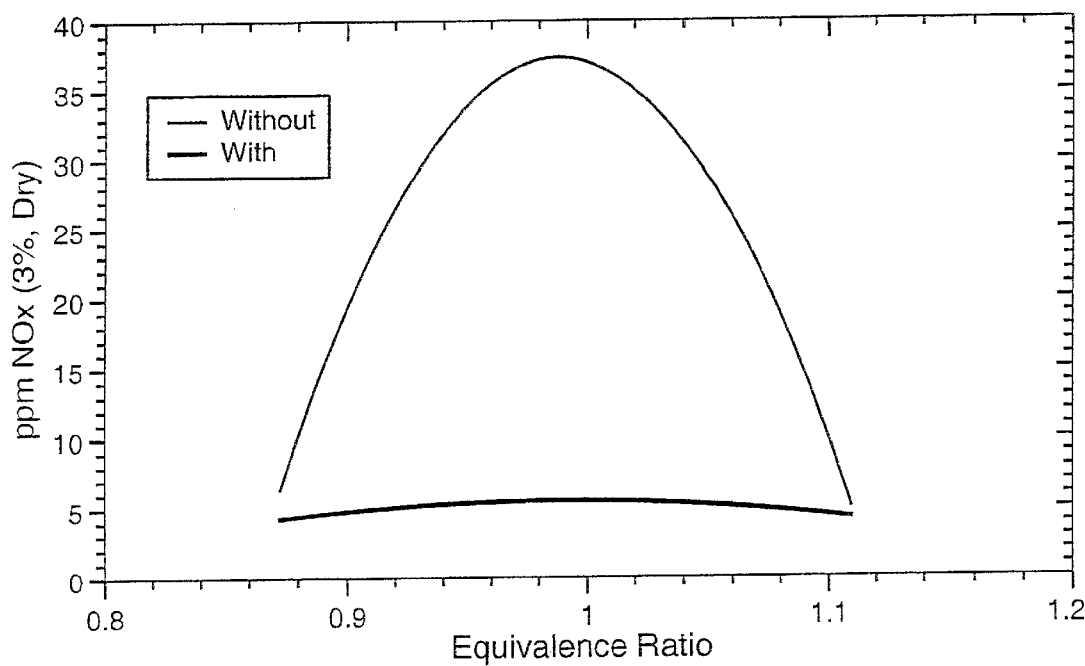
FIG._4
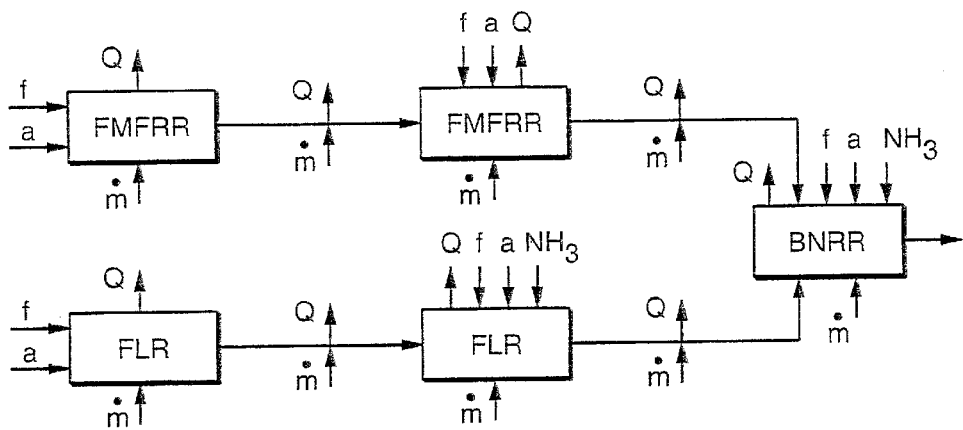
FIG._5

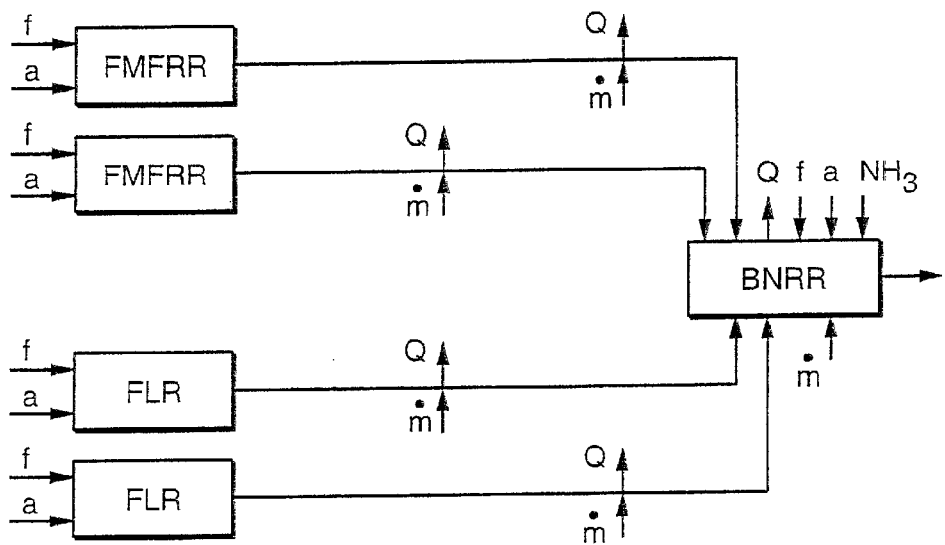
FIG._6
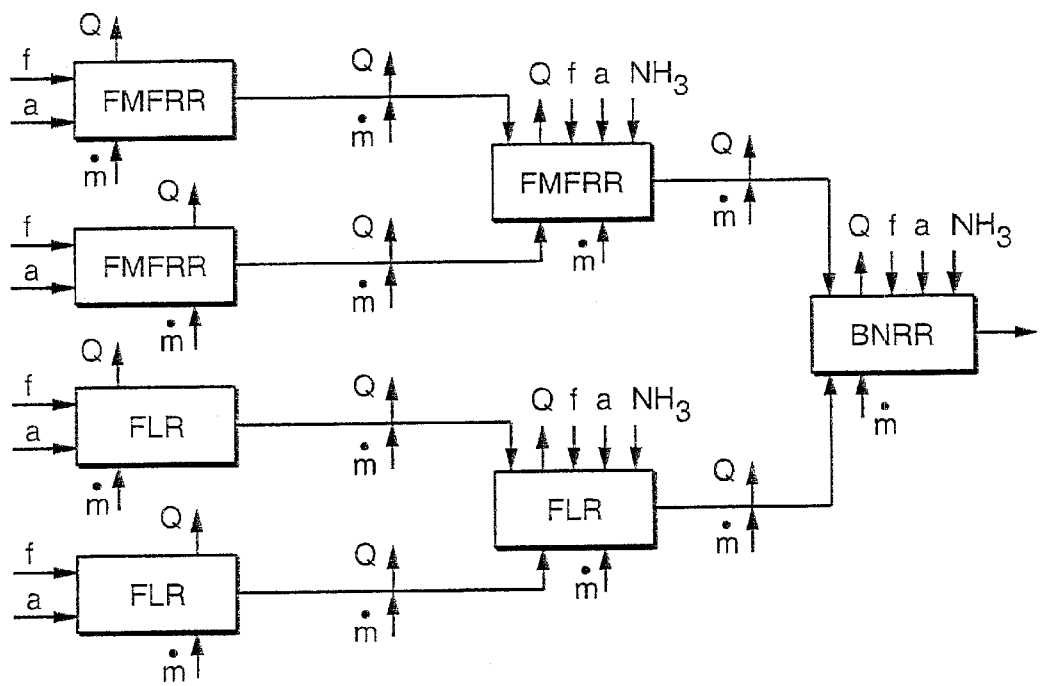
FIG._7

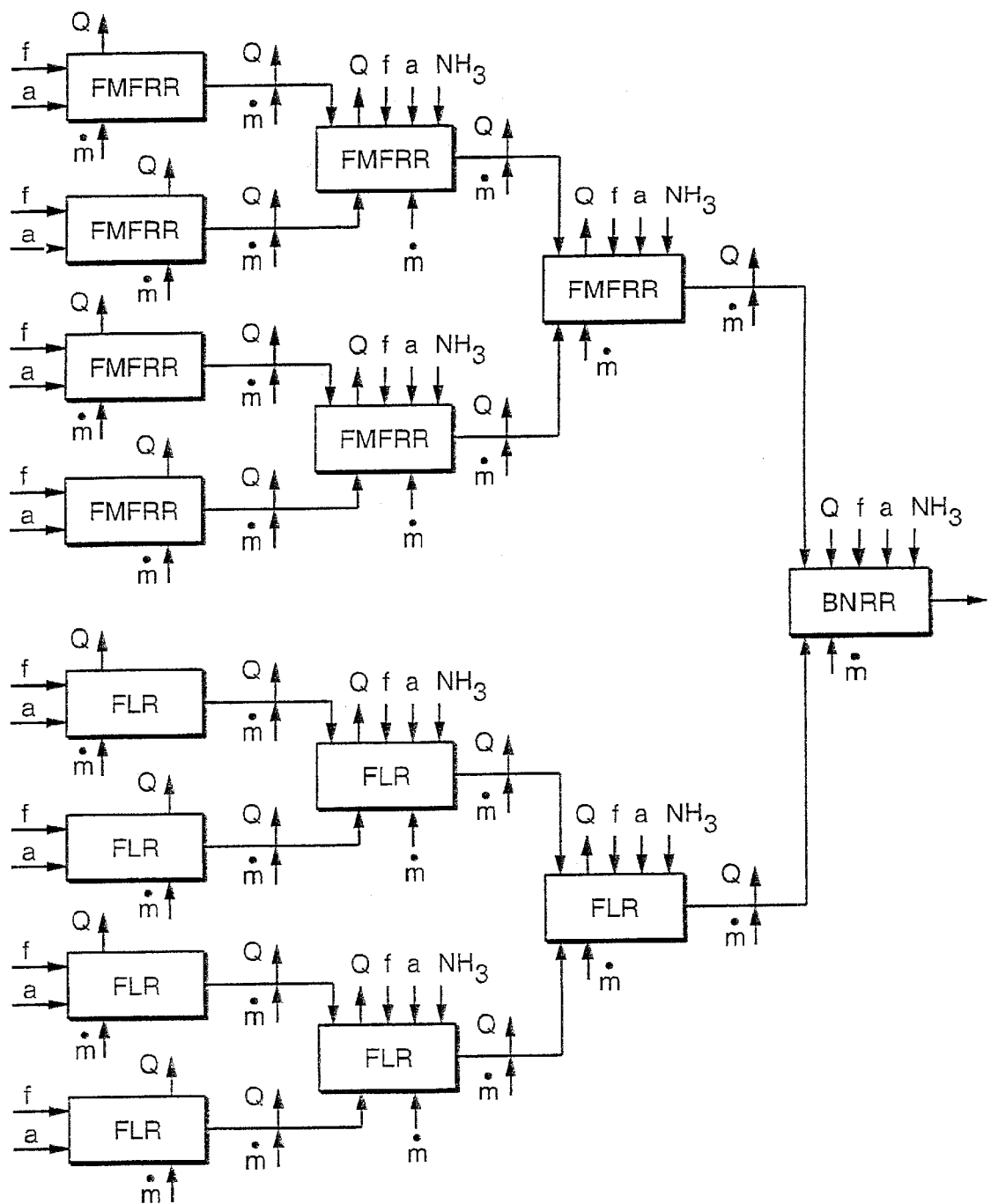
FIG._8

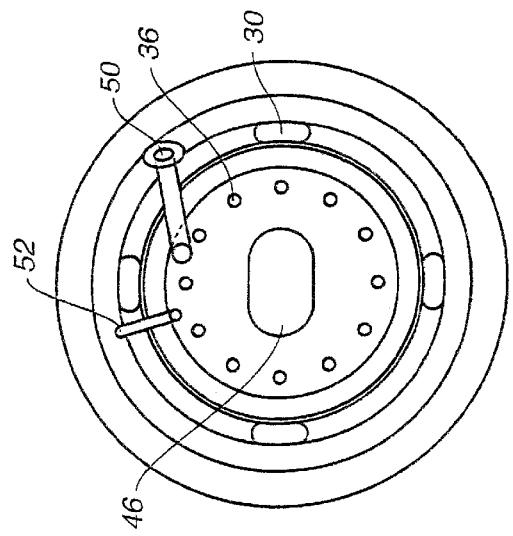
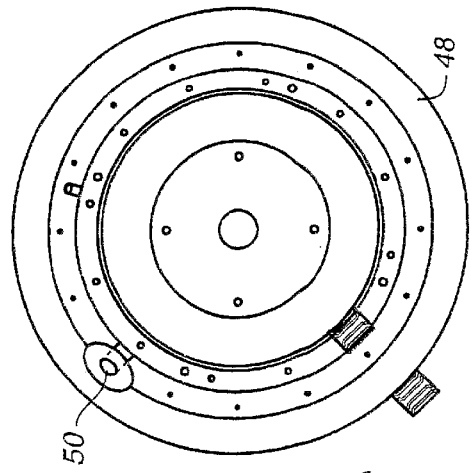
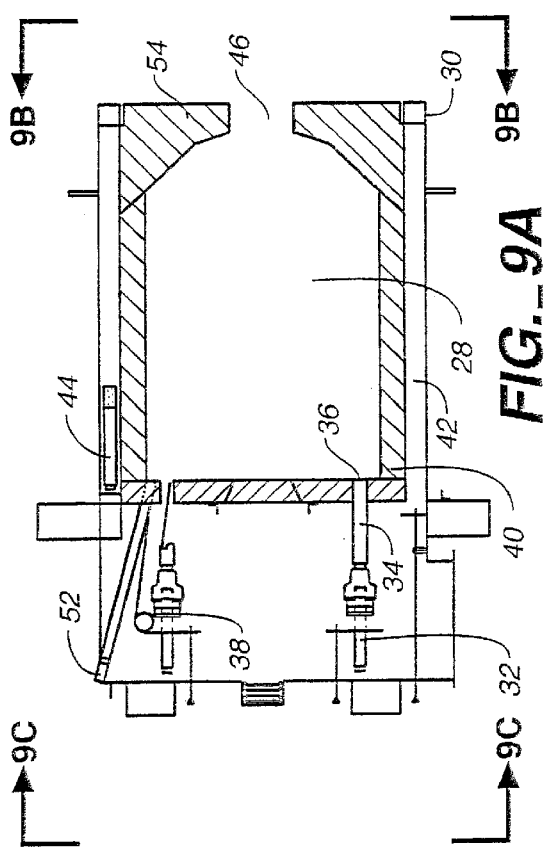

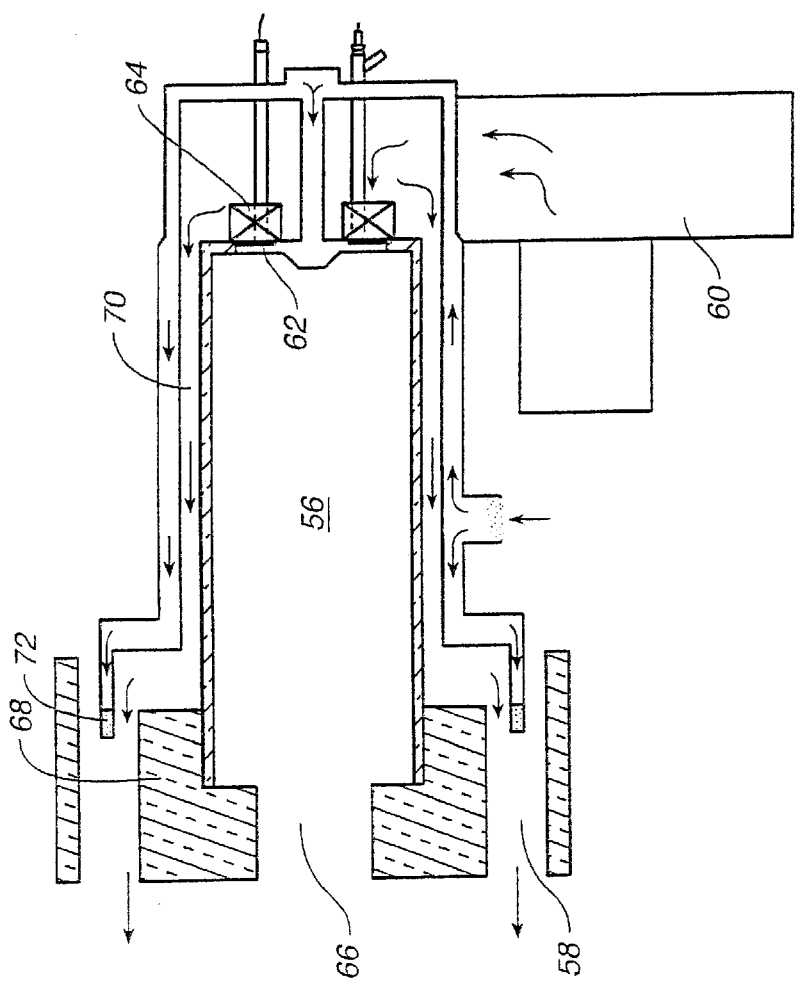
FIG._10B
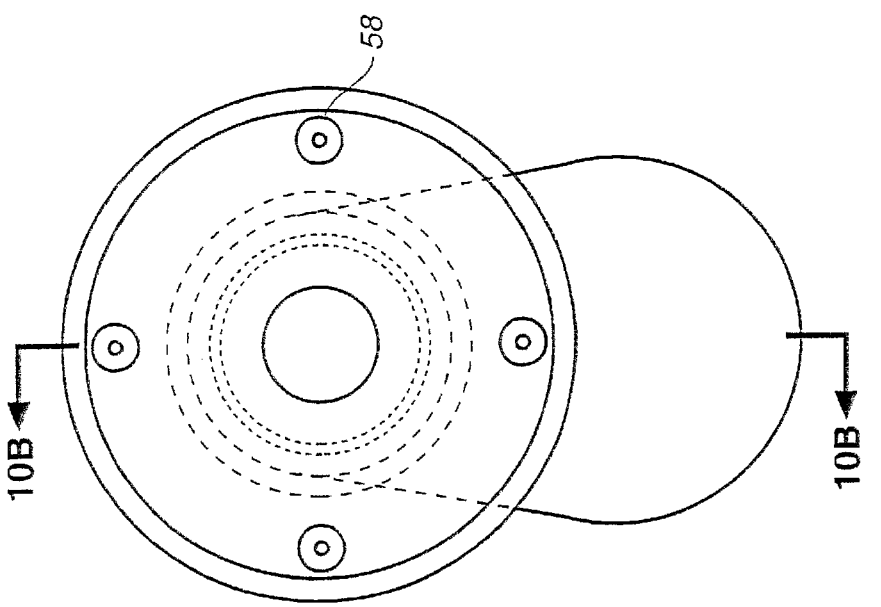
FIG._10A

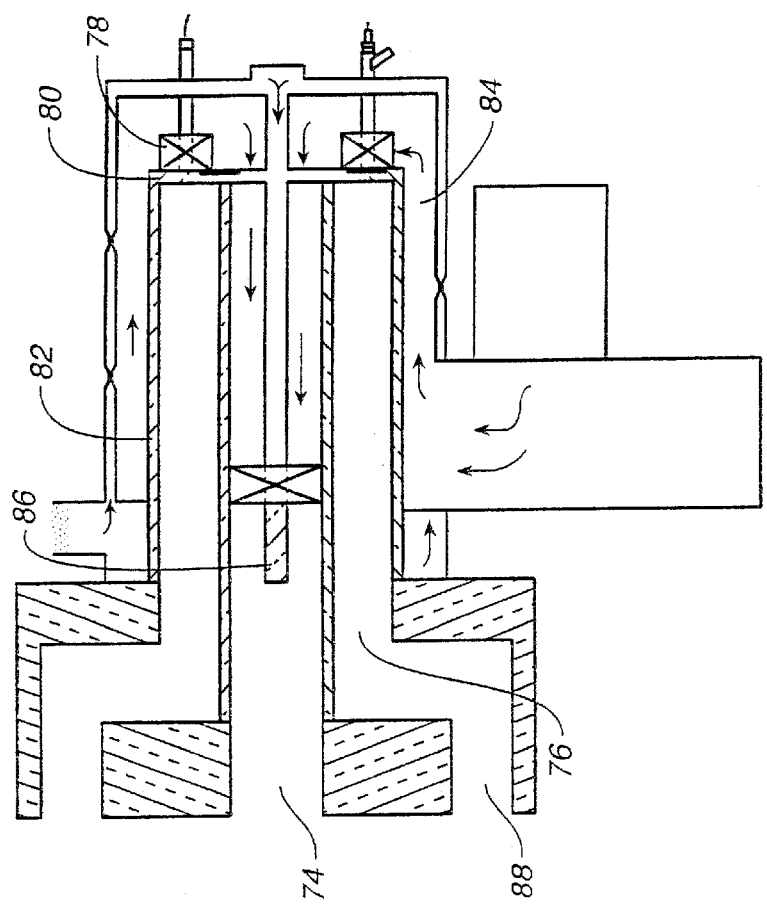
FIG._11B
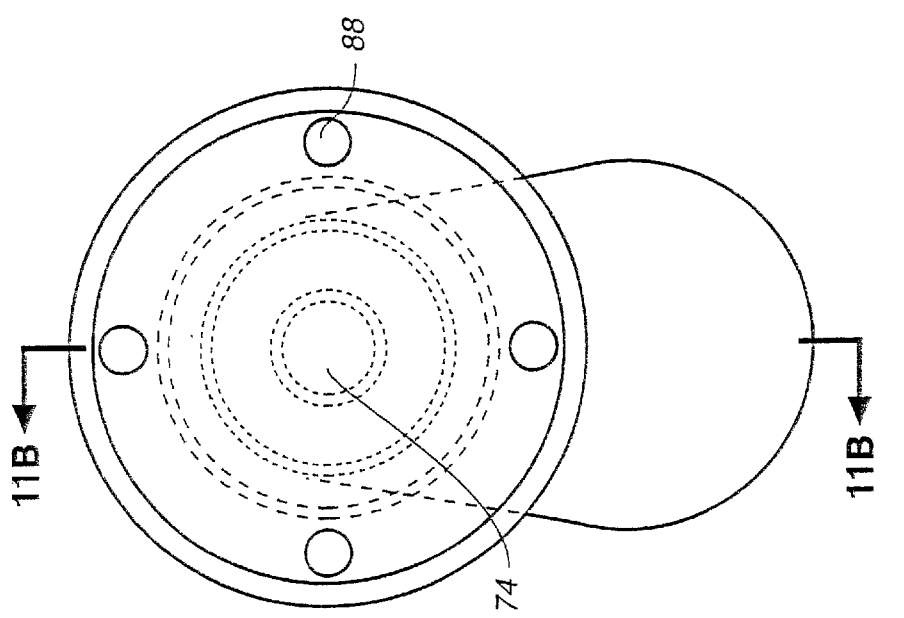
FIG._11A

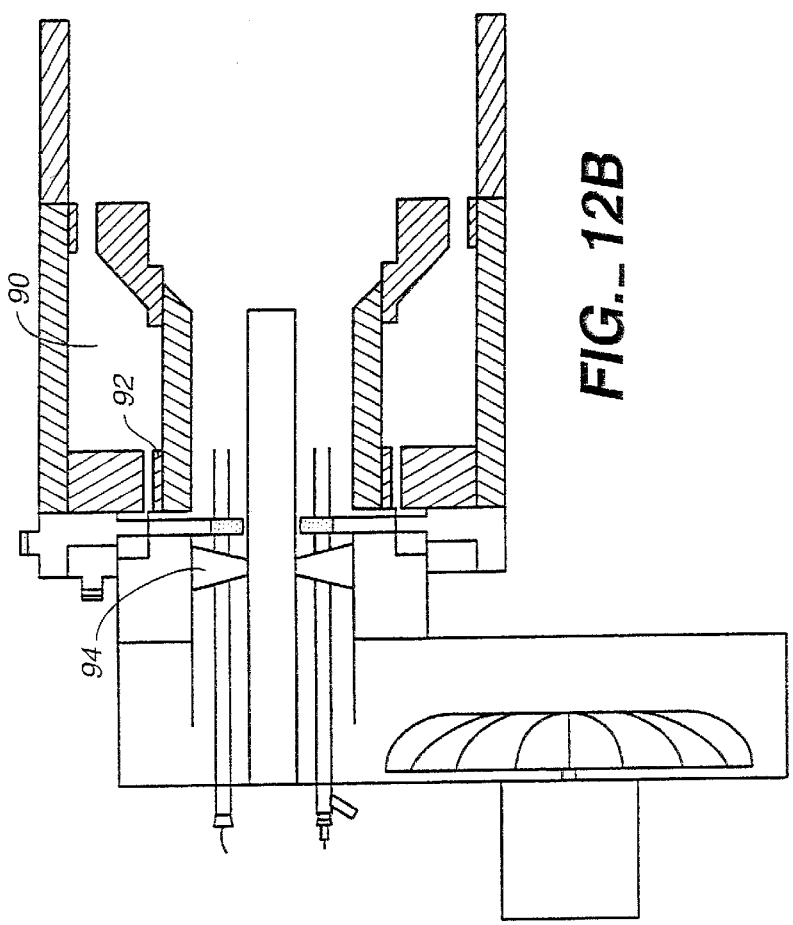
FIG._12B
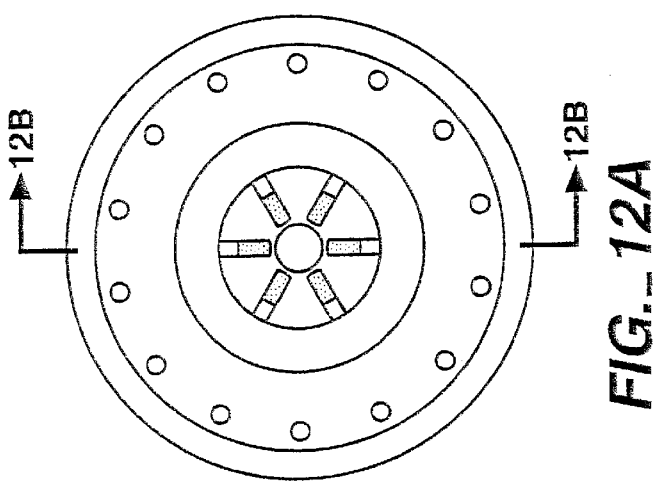
FIG._12A
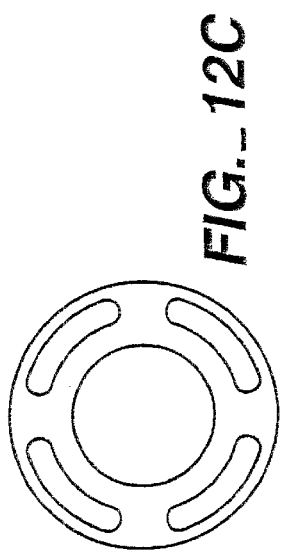
FIG._12C

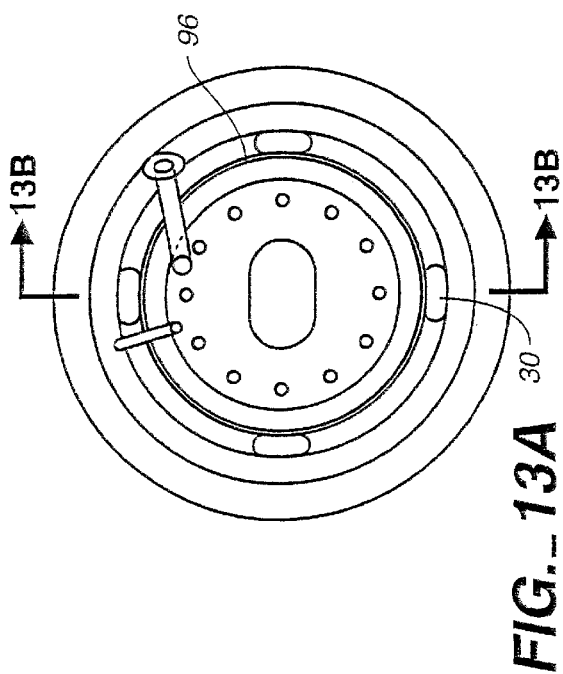
FIG._13A
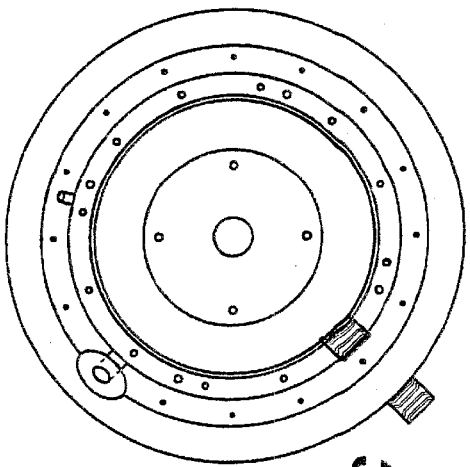
FIG._13C
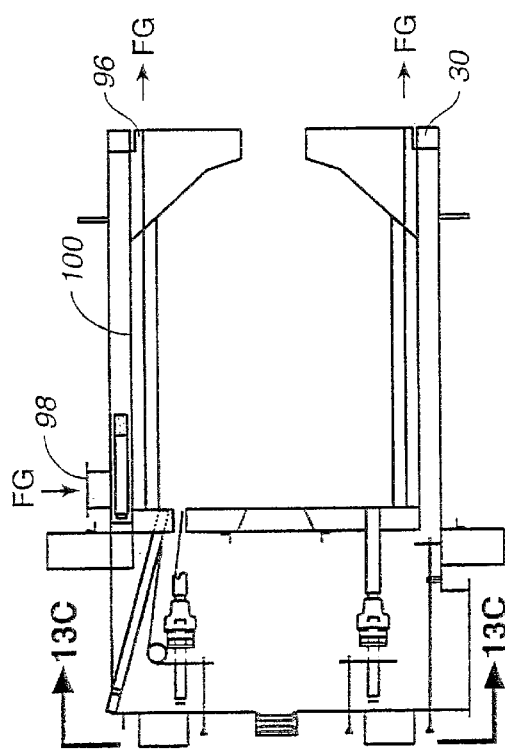
FIG._13B

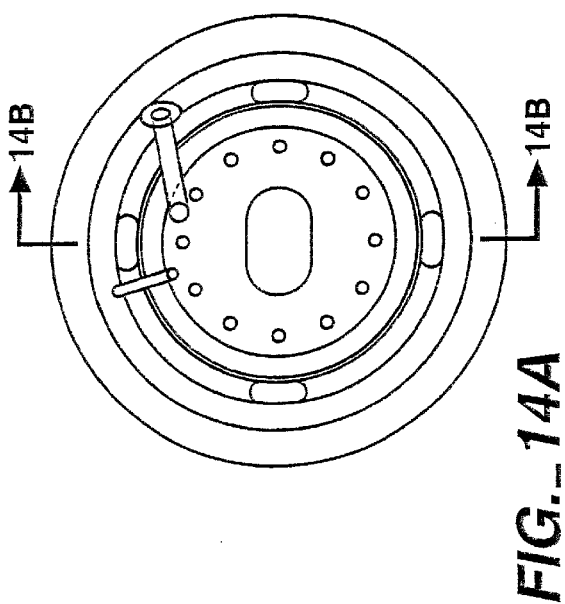
FIG._14A
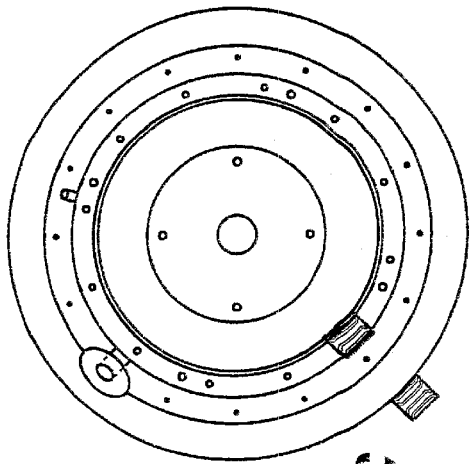
FIG._14C
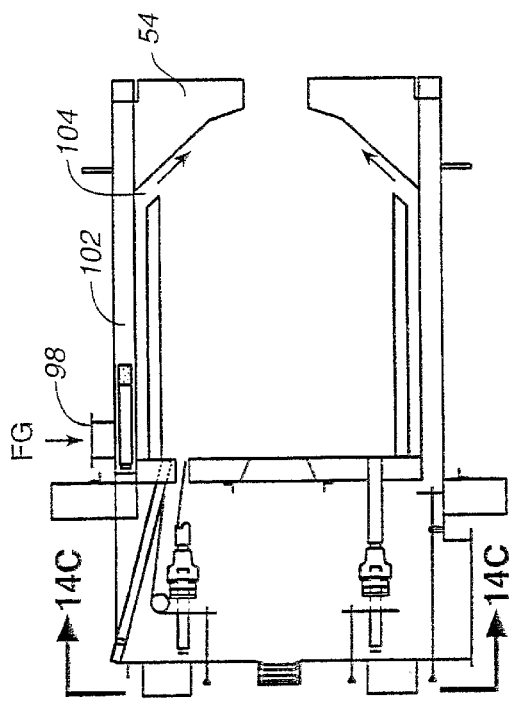
FIG._14B

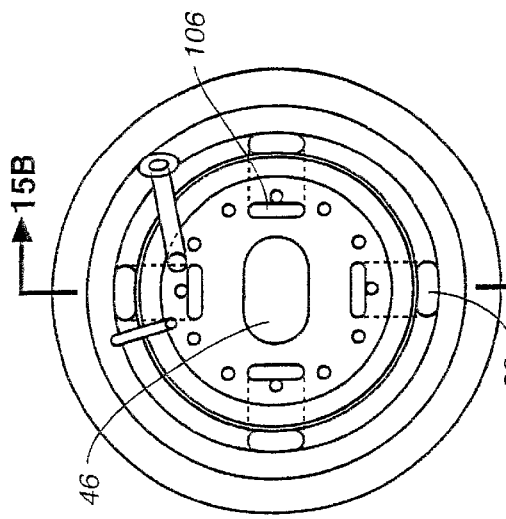
*FIG._15A*
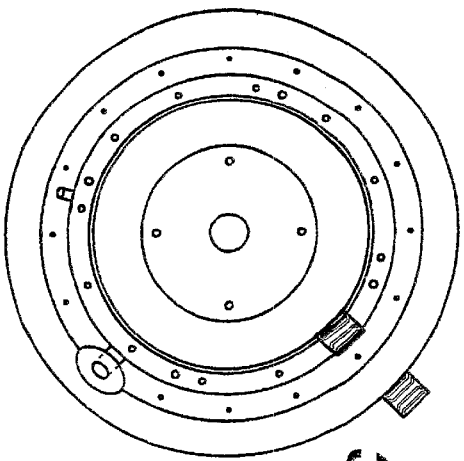
*FIG._15C*
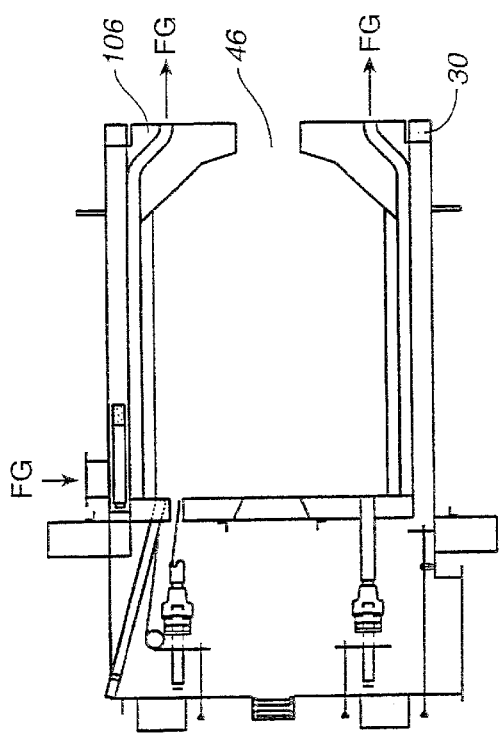
*FIG._15B*

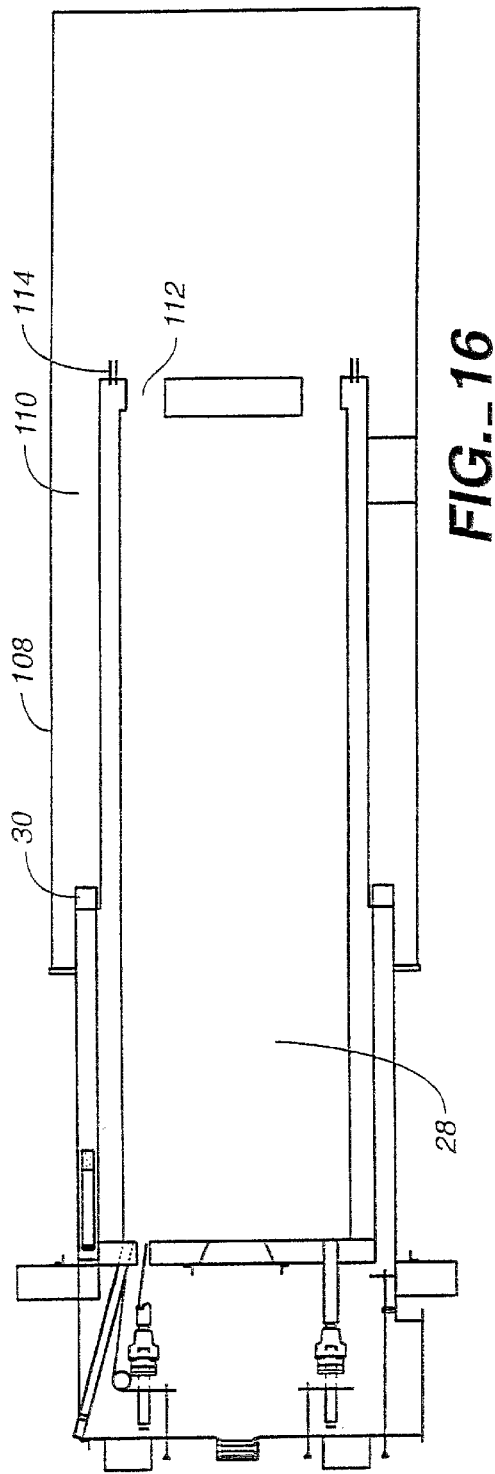
FIG._16
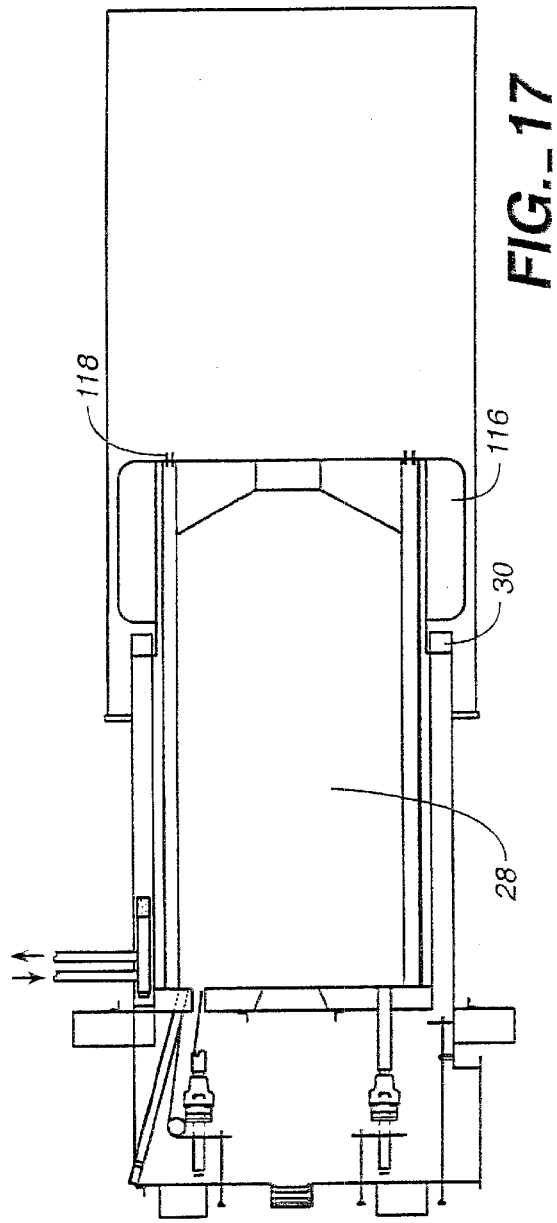
FIG._17

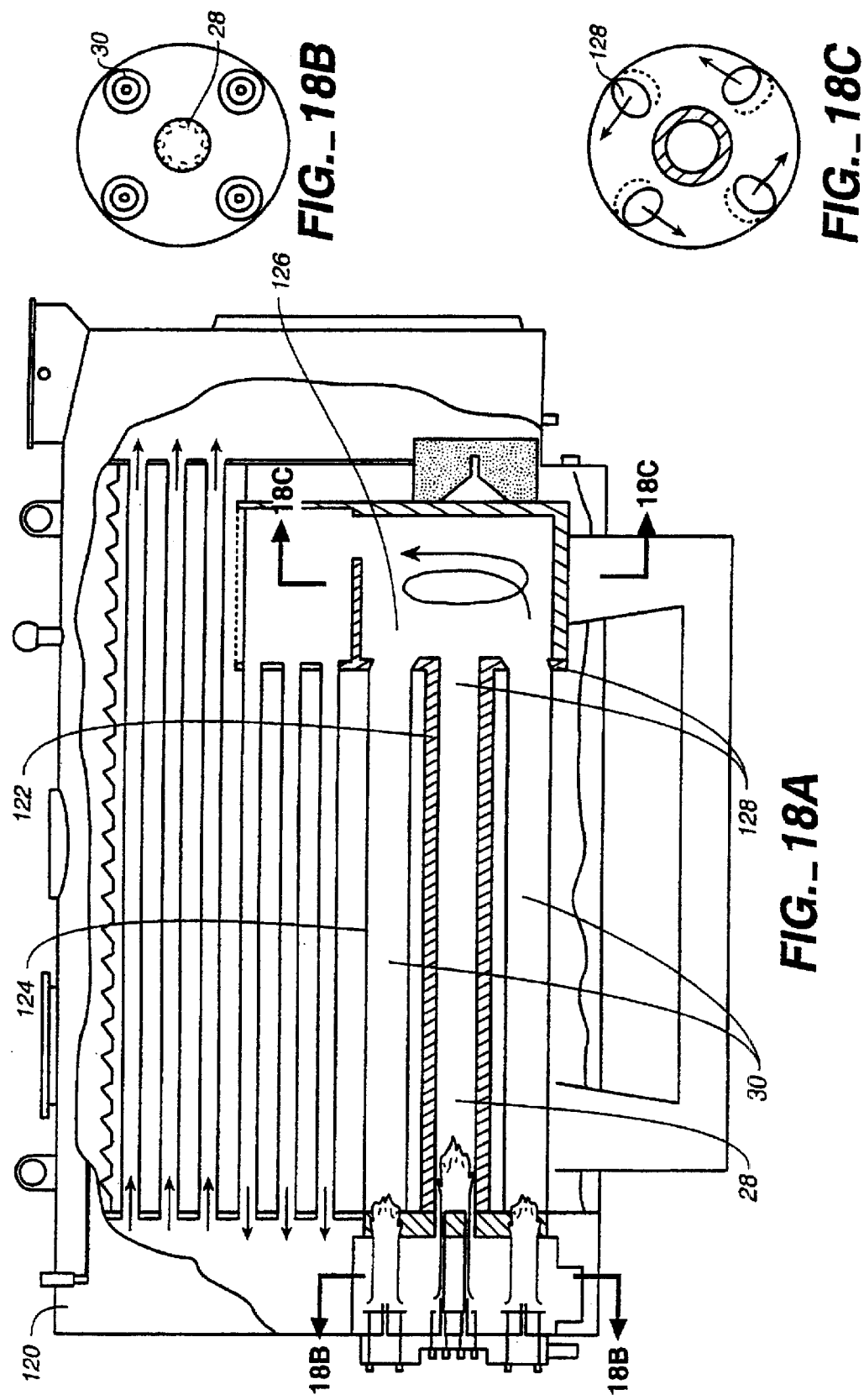

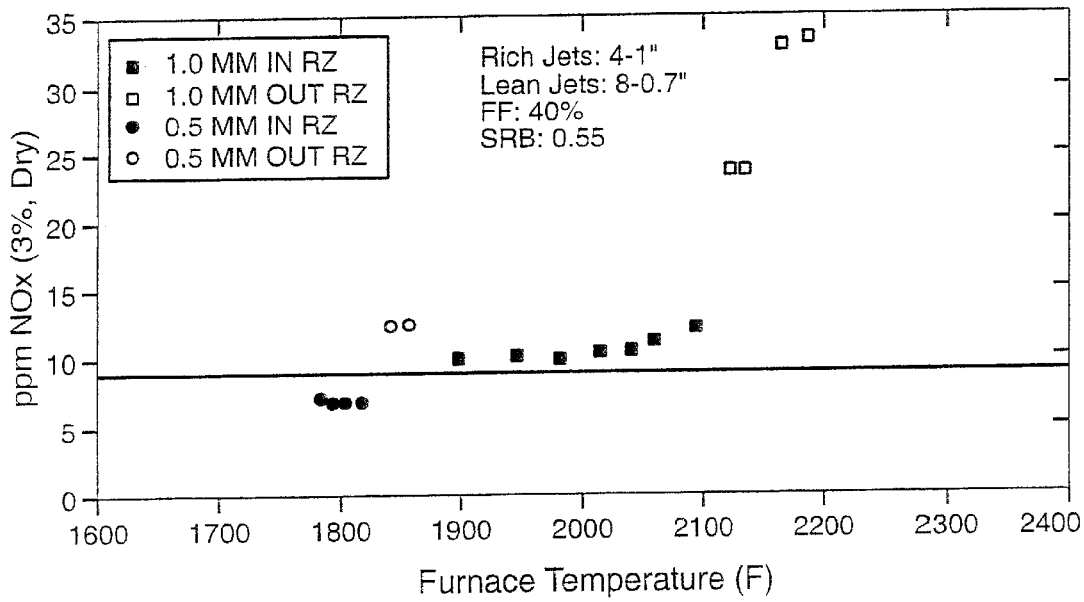
FIG._19
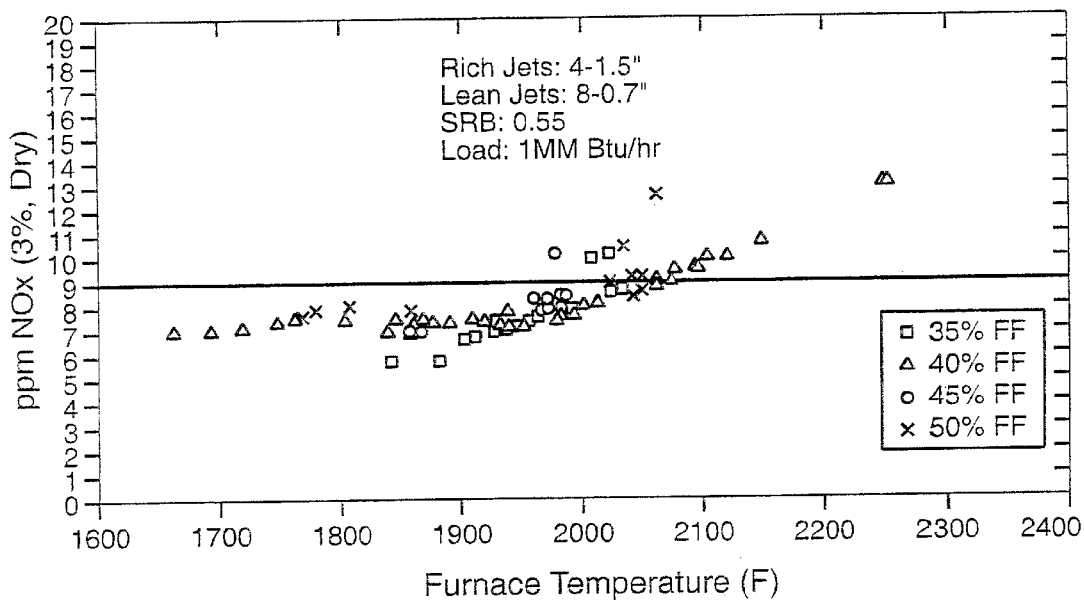
FIG._20

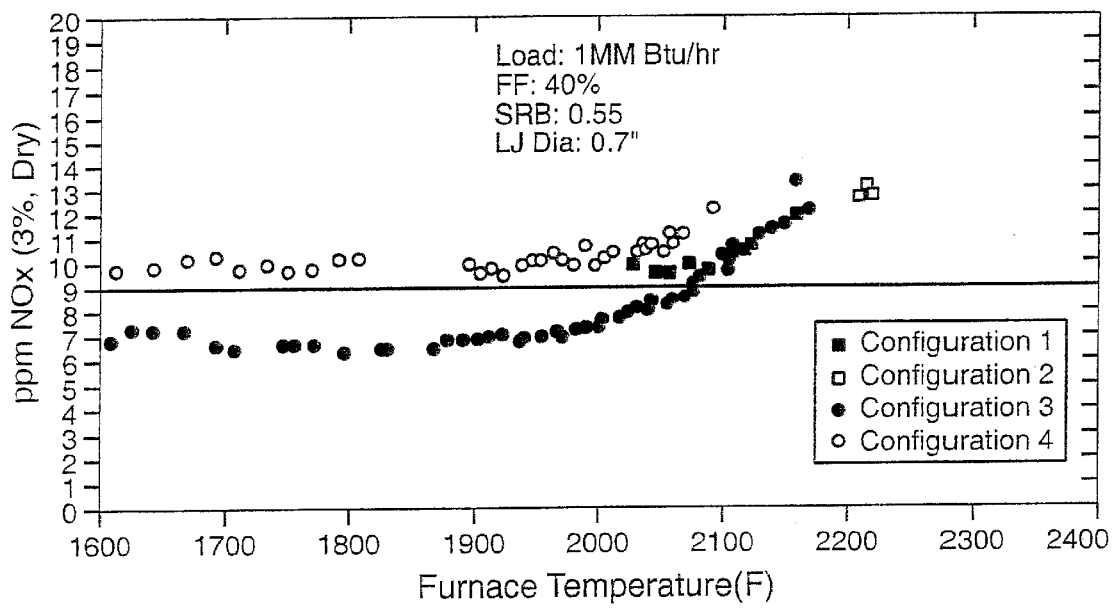
FIG._21
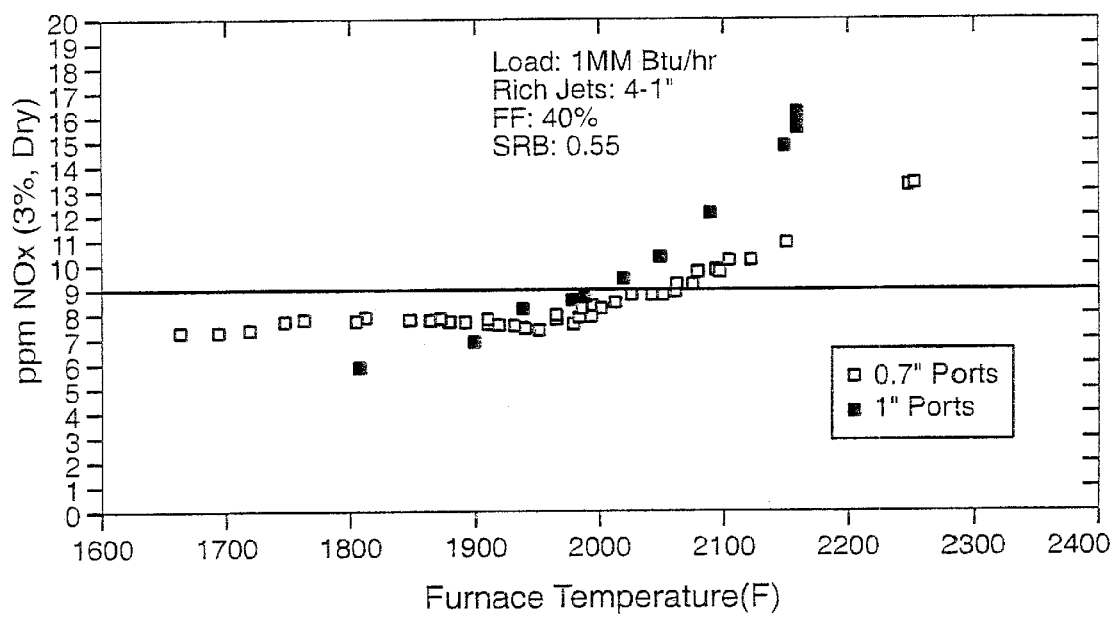
FIG._22

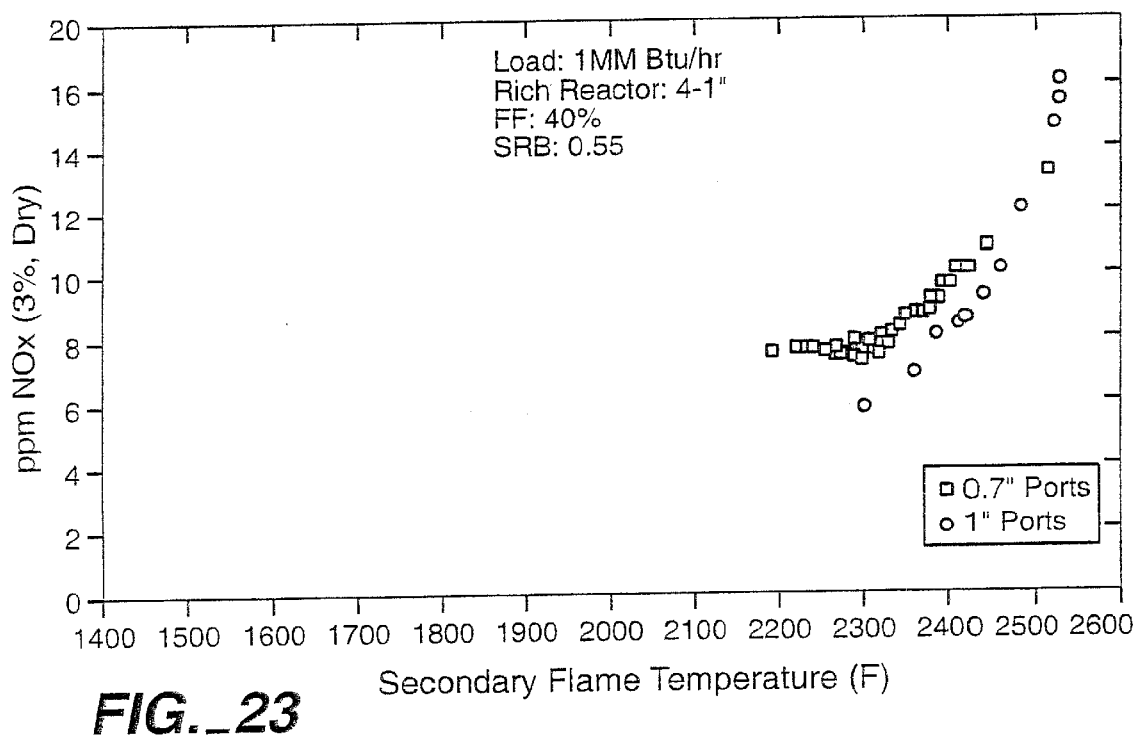
FIG._23
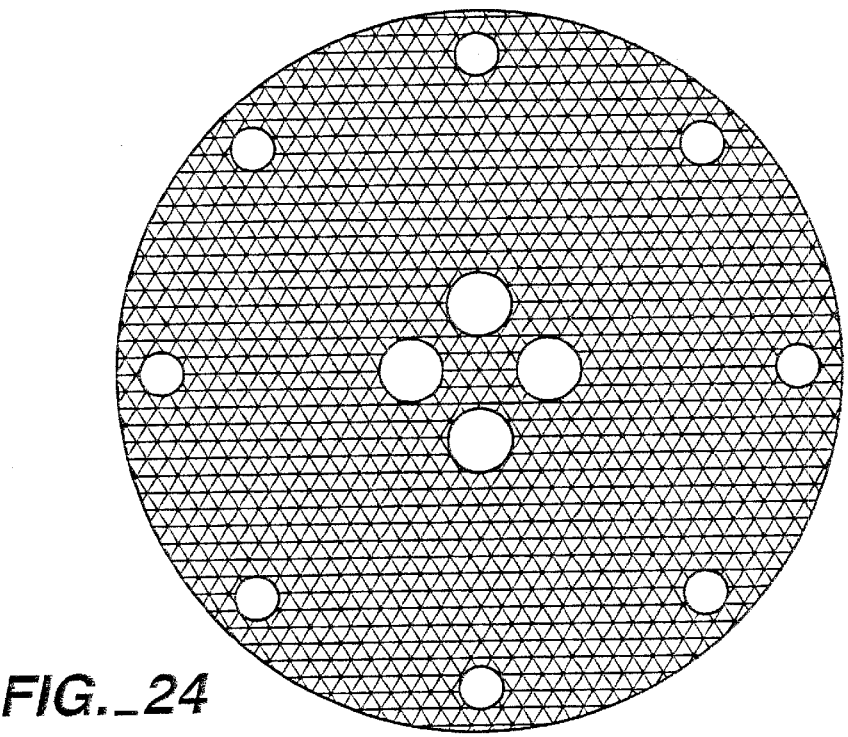
FIG._24

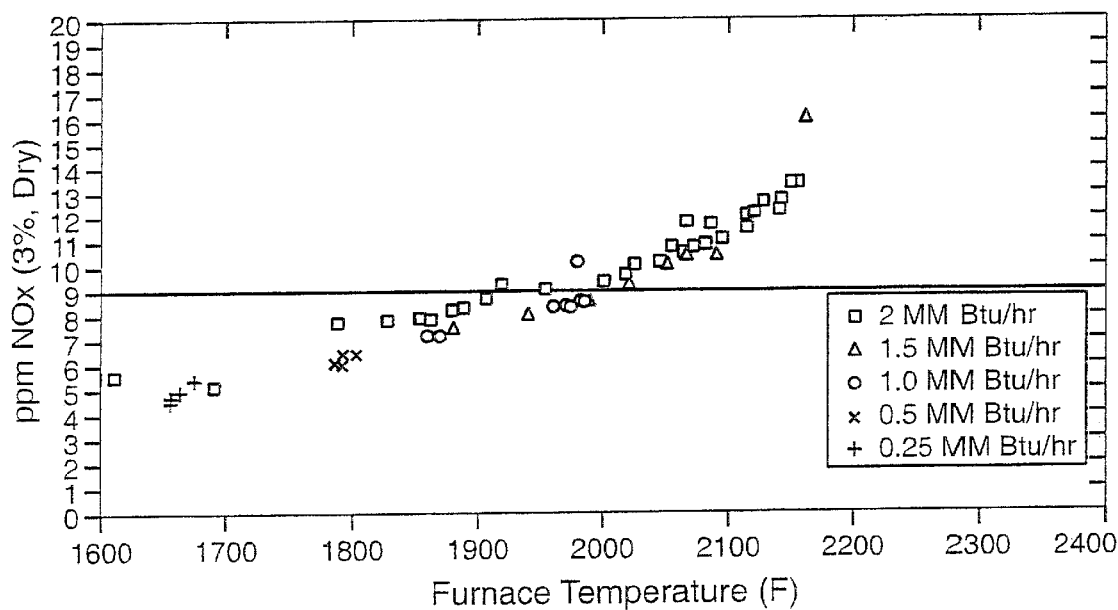
FIG._25
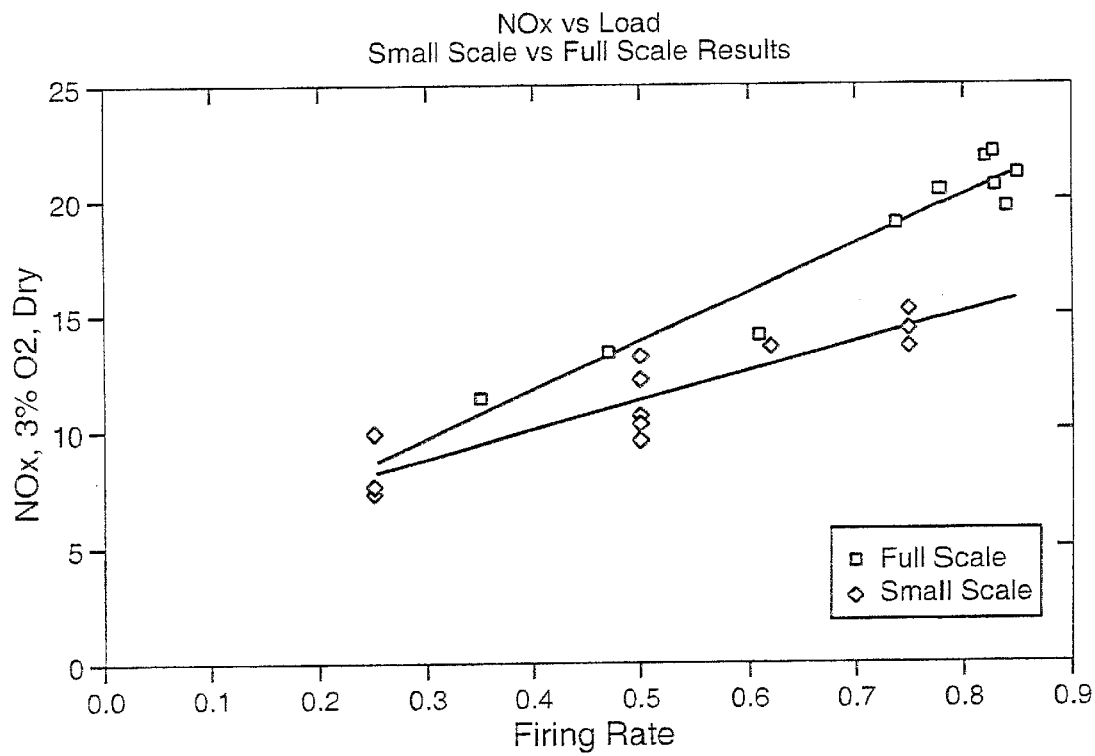
FIG._26

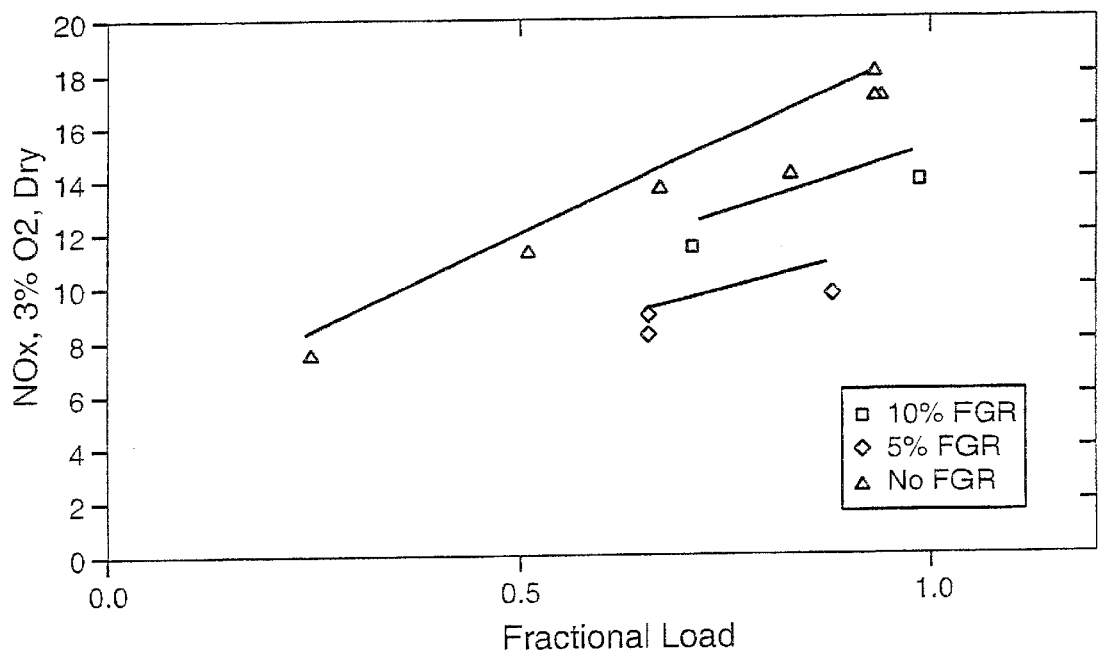
FIG._27
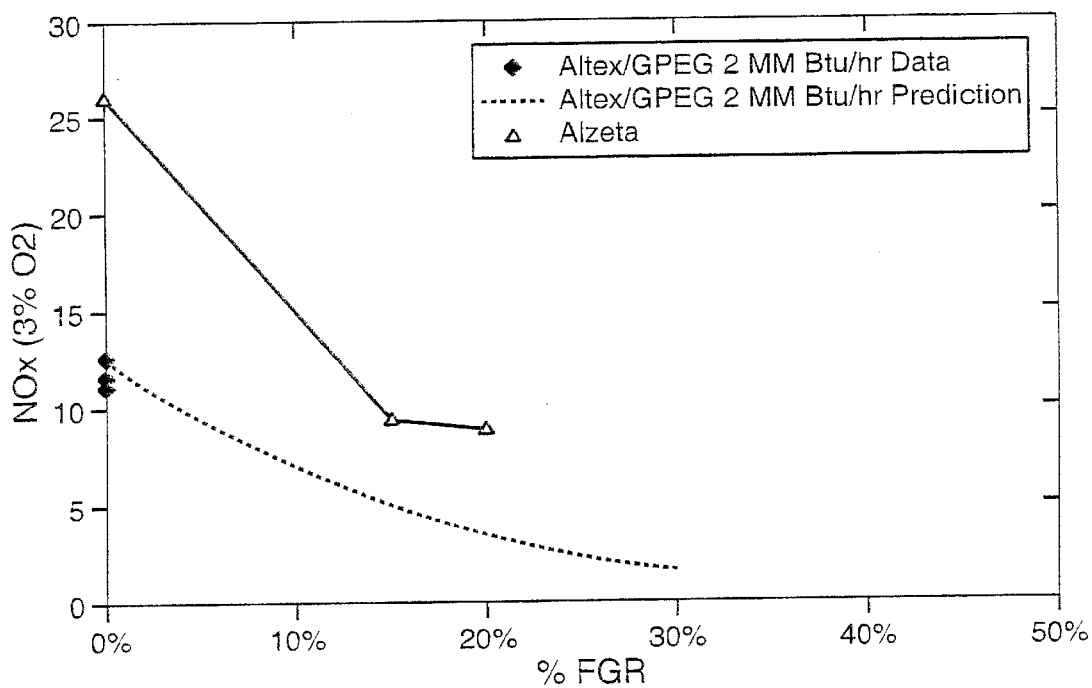
FIG._28

ULTRA REDUCED NOX BURNER SYSTEM AND PROCESS

RELATED APPLICATION

This application claims the benefit under 35 U.S.C. 119(e) of U.S. provisional application Ser. No. 60/175,866 filed Jan. 12, 2000.

BACKGROUND OF THE INVENTION

1. Field of the Invention

This invention relates to low NOx emission burners and processes.

2. Description of the Related Art

Prior to combustion system emissions regulations, burners for boilers, furnaces, etc., were designed to produce stable and quiet flames that had good heat transfer to the load. The boiler or furnace was only designed to have a combustion volume large enough to allow the flame to completely burn out, without any substantial quenching or instability. It was then left to the burner designer to package the flame in the confines of the boiler or furnace. Since cost was the major factor driving boiler or furnace designs, in many cases the combustion volumes were small, heat transfer was limited and gas temperatures were high. This drove very high NOx emissions, which prompted the introduction of regulations to limit NOx and associated air quality impacts. These regulations have forced the introduction of new burner designs that hopefully can meet NOx emissions targets as well as all other burner performance criteria. However, progress has been limited because burner designers have been reluctant to move away from basic designs that were evolved in a period prior to the imposition of NOx regulations. Significant departures from past burner designs are needed to fully meet all current burner performance requirements.

For safety, conventional burners were designed to produce nonpremixed flames, which generated stratified fuel concentrations and high temperature flame sheets that stretched across the boiler volume. In this type of flame, prompt NOx was produced on the fuel rich side of the flame and thermal NOx was produced within the high temperature flame sheet, where oxygen is available. NOx was initially reduced by controlling flame temperature, through modifications in fuel/air mixing design and/or simple introduction of diluents (e.g. cooled flue gas, steam) into the combustion air. Using diluents primarily reduced thermal NOx, with some impact on prompt NOx, which is less sensitive to temperature than thermal NOx. While NOx was controlled to some extent, burner performance characteristics, like flame stability, CO and unburned hydrocarbon emissions, heat transfer, combustion noise, and turndown, were adversely affected. This occurred even for moderate reductions in NOx. This emissions control approach was ineffective because nonpremixed flame conditions needed for optimal NOx control were in conflict with conditions needed for optimal stability, CO, unburned hydrocarbon emissions, heat transfer, combustion noise and turndown. Therefore, reliance on a single flame zone and flame type in conventional burner design constrained burner performance to be less than optimal in all categories. As NOx emission limits were further lowered, the problem became even more severe, prompting the introduction of expensive post combustion NOx control systems. In this approach a chemical NOx reducing agent is introduced into a downstream reactor, that in some cases contains a catalyst bed to facilitate the NOx reduction reaction. While these systems could reduce NOx to needed levels, and allow simple conventional burners, to be utilized, they substantially increased costs. This is partially because they needed a separate downstream reactor in which to inject a NOx reductant. In addition, with conventional burners, the amount and cost of NOx reduction agent was high, because of the stoichiometric need of the agent versus the initial high NOx.

Regulations now require that NOx be controlled to less than 5 ppm in stringently controlled regions. Given the very substantial expense of post combustion NOx control, there have been recent attempts to modify burners and flames to yield low NOx at costs below that of post combustion NOx control. This has to be accomplished with good flame stability and turndown, low noise and low CO and unburned hydrocarbon emissions. Using specially designed burners, without any post combustion NOx control features, has only been partially successful in achieving these goals.

In U.S. Pat. No. 5,603,906, a burner is described that uses cooled recirculated flue gas, inducted by fuel jets, to cool the initial flame zone and reduce NOx. Using this approach, plus multiple air injection stages stretches out the burning and reduces thermal NOx. This NOx is formed by the oxidation of nitrogen in the air, primarily under high temperature conditions with oxygen present. However, while the flame zones are cooled with this approach, and thermal NOx is reduced, there are still stratified fuel zones where fuel rich conditions yield prompt NOx. In contrast to thermal NOx, prompt NOx is initiated by the reaction of hydrocarbon fuel fragments with molecular nitrogen from the air. The intermediate nitrogenous species that are formed from this reaction (e.g. NH, $NH_2$, $NH_3$, HCN, CN) then have the potential to be oxidized and converted to NOx, once they are contacted with oxygen from the combustion air. Unfortunately, this process can even occur at fairly low temperatures, relative to typical thermal NOx processes. Therefore, to achieve ultra reduced NOx conditions with this type of burner, sufficient cooled flue gas has to be recirculated to suppress the temperature to a level where flame stability is poor. Also, under these conditions, CO and unburned hydrocarbons can be excessive, which is unacceptable. Therefore, these burners are more low NOx than ultra reduced NOx burners. Nonpremixed stratified flame regions are also the limiting condition on NOx reduction in the burner concepts described in U.S. Pat. Nos. 5,542,840, 5,460,512, 5,284,438, 5,259,755 and 5,257,927. In these cases, nonpremixed fuel is injected into the flame zone and ignited, giving stratified fuel regions, where prompt NOx can be formed. By controlling flame zone temperature with cooled flue gas injected into the fuel and/or air, or using other diluents, such as water, steam, etc., thermal NOx can be suppressed. However, ultra reduced NOx emissions cannot be achieved at acceptable flame stability, noise, CO and unburned hydrocarbon emissions levels. For example, the burner described in U.S. Pat. No. 5,460,512 requires over 40% flue gas recirculation to achieve low NOx. At this level, flame stability becomes a problem, and operational safety is of sufficient concern to lead the burner company to recommend further development and testing of this concept.

Recognizing this NOx control limitation of nonpremixed flames and stratified flame regions, attempts have been made to apply premixed flame concepts to low NOx burners. If the burner design uses premixed fuel and air with an excess of oxygen, then stratified fuel regions and prompt NOx processes are minimized. To achieve the needed thermal NOx reduction, burners with premixed or near premixed flames that utilize Flue Gas Recirculation (FGR) dilution have been conceptualized. By premixing the fuel and air with an excess of oxygen, prompt NOx, that is formed in fuel rich regions is suppressed. When combined with flue gas recirculation, that reduces thermal NOx emissions, lower levels of NOx can be achieved. An example of this approach is the burner highlighted in U.S. Pat. No. 5,407,347, which uses swirl vane injection of gas fuel to get a premixed or near premixed state while avoiding flame flashback problems, inherent in premixed systems with near stoichiometric conditions. Combining this burner design with cooled flue gas recirculation can reduce NOx. However, premixed flames are very compact and the flame can easily couple with boiler acoustics, giving excessive noise and even damaging vibrations. In addition, to achieve the ultra-low NOx, very high levels of FGR are needed. According to the patent, 50 to 60% flue gas recirculation is needed to minimize NOx. This can destabilize flames, limiting burner turndown and possibly even leading to flame blowout. If this occurs, the boiler can fill with an unburned mixture of air and fuel, which can then be a severe explosion hazard. Lastly, with large amounts of flue gas, the flame becomes transparent, and heat transfer is reduced in the initial boiler volume to the point where "back pass" and tube sheet temperatures may exceed boiler design limits. In this case, the boiler could be degraded or even fail. Therefore, conditions that improve NOx with this flame type lead to degradation in other important burner and system performance characteristics. Again, a single flame type constrains performance so that an optimization of all burner performance parameters cannot be achieved.

To address fuel lean low NOx flame stabilization, burner designers introduced fuel rich flames that help stabilize fuel lean flames. Burner designs considering alternating fuel rich and fuel lean premixed flames were proposed in U.S. Pat. Nos. 5,368,476 and 5,073,106. These designs were directed at small capacity applications, such as home appliance burners. By introducing a fuel rich flame adjacent to a mixture of fuel gas and an excess of air, the lean low NOx flame is better stabilized and turndown is improved. However, the prompt NOx in the fuel rich stabilization flame is not addressed in this design. This will tend to offset the NOx reduction achieved by the lean flame and prevent ultra reduced NOx emissions from being achieved. Also, when the fuel rich flame products merge with the fuel lean flame products, the resulting reaction will increase the local burnout zone temperature and tend to produce NOx. Therefore, without some control of the burnout zone temperature, through heat extraction or dilution of the gases, NOx emissions are further compromised. Lastly, although fuel rich flames are more stable then very fuel lean flames, they are less stable than stoichiometric flames. Therefore, adding fuel rich flames to fuel lean flames is not totally satisfactory. To address the stabilization limitation of the designs referenced in the above patents, the burner design referenced in U.S. Pat. No. 5,022,849 proposes using a near stoichiometric stabilization flame interspaced between the fuel rich and fuel lean flames, or attached to separate fuel rich or fuel lean flames at their periphery. As noted above, whether fuel rich or fuel lean, premixed flame stability is compromised. By inserting a near stoichiometric flame between fuel rich or fuel lean flames, or at their periphery, flame stabilization can be improved. However, the improvement is limited. As is well known, premixed flames have a distinct flame speed that must be balanced against the reactant velocity. Unless the premixed flame is anchored to the burner by substantial recirculation of hot products that continually ignite the reactants, flame instability, and blowoff are possible. In addition, the near stoichiometric premixed stabilization flame has a high potential for acoustic coupling and noise generation. Therefore, while flame stability is improved by the design proposed in U.S. Pat. No. 5,022,849, it is not improved to the needed level for stable, low noise and safe operation at ultra reduced NOx conditions. Also, while the patent highlights a low NOx aspect of the design, ultra reduced NOx levels will be difficult to achieve at good flame quality. This is because of fuel rich flame prompt NOx production, near stoichiometric flame high thermal NOx production and higher then desired NOx production in the burnout flame, as a result of the high temperature and lack of temperature control of the burnout flame. Therefore, while an improvement, the design proposed in U.S. Pat. No. 5,022,849, does not optimize stability or NOx emissions.

To better optimize fuel rich flame stability, the design highlighted in U.S. Pat. No. 6,089,855 utilizes a vortex precombustor to contain the burning fuel rich mixture and recirculate combustion products back towards the reactant entrance to continuously ignite and stabilize the flame. Fuel rich flame stability can be improved by recirculating combustion products to continuously ignite and stabilize reactants. Air is then injected downstream to complete combustion. By thoroughly mixing gases within the rich zone, ignition and stability are improved over the open flame burner approaches highlighted in U.S. Pat. Nos. 5,368,476, 5,073,106 and 5,022,849. When air is injected into the fuel rich products downstream of the vortex reactor, any remaining fuel components are oxidized at high temperature. To suppress NOx, final burnout one flame temperature must be reduced. This is indirectly accomplished in the design in U.S. Pat. No. 6,089,855 by the recirculation of cooled products in the fuel rich reactor. This initially lowers the reactor temperature and the burnout flame temperature, which is needed for good NOx control. Furthermore, mixing of the burnout combustion air with cooled combustion products in the furnace is also promoted to control burnout temperature and NOx. While cooling the initial fuel rich reaction helps lower Nox in the final burnout zone, it also reduces the stability of fuel rich flames. Also, while the use of the reactor confinement reduces stratified fuel regions where prompt NOx is formed, the lower temperature and thorough mixing does not recognize important other NOx control benefits of a fuel rich reactor. These benefits are achieved by following the stirred or mixed zone that promotes flame stability by a zone where the rich products are held at high temperature in a plug flow state for a given residence time that causes a suppression of fixed nitrogen compounds as well as NOx. If combined with products from fuel lean flames and reacted together, these fuel rich conditions lead to a minimization of NOx exiting the burnout zone.

Previously defined nonpremixed or premixed low NOx burner flames cannot optimally reduce NOx production, while simultaneously optimizing other important burner performance characteristics. Furthermore, whether nonpremixed or premixed, low NOx burners have focused on suppressing NOx production, primarily by temperature control. However, to minimize NOx, reduction processes, as well as NOx production suppression processes must be considered. By optimizing both processes, NOx can be minimized, while maintaining all other important burner performance characteristics.

SUMMARY OF THE INVENTION

The invention in summary provides burner system and processes which bring both NOx production suppression and NOx reduction control functions together in a single design that generates several reaction zones in which NOx control is balanced with other important combustion characteristics such as flame stability, low CO and unburned hydrocarbon emissions, noise, vibrations, turndown, operability and heat transfer.

BRIEF DESCRIPTION OF THE DRAWINGS

FIG. 1(a) is a flow chart of the process of the broad concept of the invention.

FIG. 1(b) is a schematic diagram of a burner system of apparatus in accordance with one embodiment of the invention.

FIG. 2 is a graph showing nitrogen compounds as a function of primary fuel rich combustion chamber equivalence ratio in the invention.

FIG. 3 is a chart showing NOx emission as a function of fuel lean flame equivalence ratio in the invention.

FIG. 4 is a chart showing exhaust NOx emissions as a function of equivalence ratio across the burnout zone, both with and without burnout zone temperature reduction.

FIG. 5 is a schematic diagram of a burner system and process in accordance with another embodiment.

FIG. 6 is a schematic diagram of a burner system and process in accordance with another embodiment.

FIG. 7 is a schematic diagram of a burner system and process in accordance with another embodiment.

FIG. 8 is a schematic diagram of a burner system and process in accordance with another embodiment.

FIG. 9A is a side elevation view of a burner system in accordance with one embodiment of the invention.

FIG. 9B is an end view taken along the line 9B—9B of FIG. 9A.

FIG. 9C is an end view taken along the line 9C—9C of FIG. 9A.

FIG. 10A is an end view of a burner system in accordance with another embodiment.

FIG. 10B is a longitudinal section view taken along the line 10B—10B of FIG. 10A.

FIG. 11A is an end view of a burner system in accordance with another embodiment.

FIG. 11B is a longitudinal section view taken along the line 11B—11B of FIG. 11A.

FIG. 12A is an end view of a burner system in accordance with another embodiment, FIG. 12B is a longitudinal section view taken along the line 12B—12B of FIG. 12A.

FIG. 12C is an end view of the exit jet of the reactor shown FIG. 12B.

FIG. 13A is an end view of a burner system in accordance with another embodiment.

FIG. 13B is a longitudinal section view taken along the line 13B—13B of FIG. 13A.

FIG. 13C is an end view taken along the line 13C—13C of FIG. 13B.

FIG. 14A is an end view of a burner system in accordance with another embodiment.

FIG. 14B is a longitudinal section view taken along the line 14B—14B of FIG. 14A.

FIG. 14C is an end view taken along the line 14C—14C of FIG. 14B.

FIG. 15A is an end view of a burner system in accordance with another embodiment.

FIG. 15B is a longitudinal section view taken along the line 15B—15B of FIG. 15A.

FIG. 15C is an end view taken along the line 15C—15C of FIG. 15B.

FIG. 16 is a longitudinal section view of a burner system in accordance with another embodiment.

FIG. 17 is a longitudinal section view of a burner system in accordance with another embodiment.

FIG. 18A is a longitudinal section view of a burner system in accordance with another embodiment.

FIG. 18B is a cross section taken along the line 18B—18B of FIG. 18A.

FIG. 18C is a cross section taken along the line 18C—18C of FIG. 18B.

FIG. 19 is a chart showing NOx emissions as a function of furnace exhaust temperature for reaction both inside and outside the rich reactor in accordance with an embodiment.

FIG. 20 is a chart showing NOx emissions as a function of furnace exhaust temperature and fuel fraction in accordance with another embodiment.

FIG. 21 is a chart showing NOx emissions as a function of furnace temperature and rich jet configuration in accordance with another embodiment.

FIG. 22 is a chart showing NOx emissions as a function of furnace temperature and lean jet configuration in accordance with another embodiment.

FIG. 23 is a chart showing NOx emissions as a function secondary flame temperature for different lean jet configurations in accordance with another embodiment.

FIG. 24 is an end view of the configuration of a burner system in accordance with the invention showing rich inner and lean outer round open jets.

FIG. 25 is a graph showing NOx emissions as a function of furnace temperature and firing rate in accordance with another embodiment.

FIG. 26 is a graph showing NOx emissions as a function of firing rate for both large and small scale versions of the burner in accordance with another embodiment.

FIG. 27 is a graph showing NOx emissions as a function of fractional load for different levels of flue gas recirculation in accordance with another embodiment.

FIG. 28 is a chart showing NOx emissions for the invention as a function of flue gas recirculation for a commercial scale burner compared with Alzeta burner results.

DESCRIPTION OF THE PREFERRED EMBODIMENTS

Figure 29:
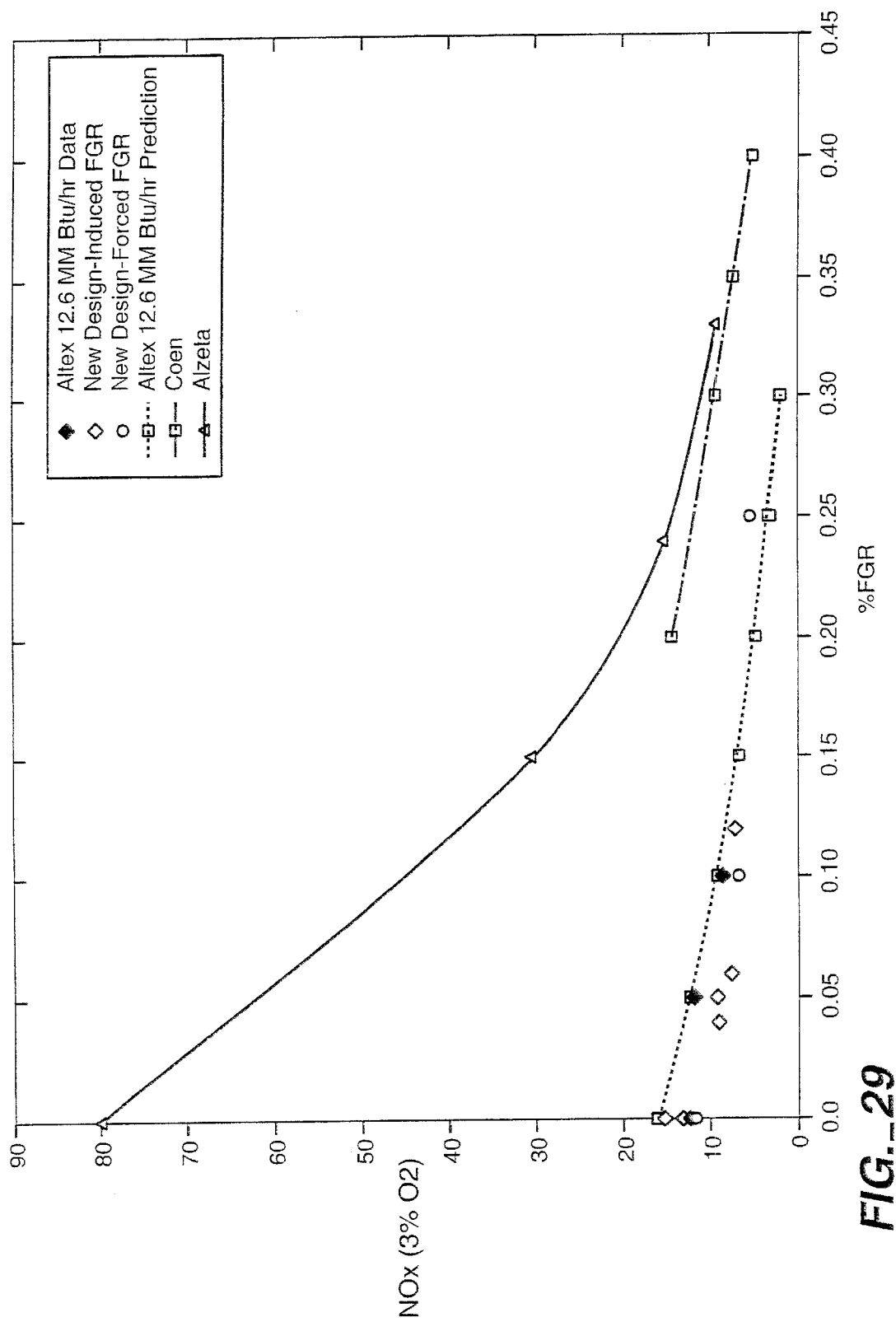
FIG. 29 is a graph showing NOx emissions as a function of flue gas recirculation for an industrial scale burner compared to Alzeta and Coen burner results.

FIGS. 1a and 1b present schematics of the Ultra Reduced Nox Burner (URNB) process, where Fuel Modification Fuel Rich Reactor (FMFRR) zone gases are brought together with products from a Fuel Lean Reactor (FLR) zone in a lower temperature Burnout and NOx Reduction Reactor (BNRR) zone. Briefly, the FMFRR stabilizes combustion, through early recirculation of hot products to the reactants, controls the production of NOx and the reduction of nitrogenous species following the early zone, generates soot for good heat transfer and converts the fuel to hydrogen and carbon monoxide, all of which have a low potential for forming prompt NOx. This is in contrast to U.S. Pat. Nos. 5,368,476, 5,073,106 and 5,022,849, where the fuel rich reactants are burned in open flames, where stabilization is compromised. In addition, plug flow conditions in the end of the FMFRR, which follows the stirred zone, produce a proper mix of nitrogenous species and NOx, that when mixed with the Fuel Lean Reactor (FLR) products in the Burnout and NOx Reduction Reactor (BNRR) results in effective NOx reduction, as well as good CO burnout. This is in contrast to the thoroughly mixed conditions described in U.S. Pat. No. 6,089,855, which will not optimally decay the nitrogenous species and NOx before burnout. In addition, the approach described in U.S. Pat. No. 6,089,855 injects and burns all of the fuel in the reactor. This requires a large volume reactor that is expensive and difficult to adapt to existing boilers. In contrast the URNB only burns approximately 40% of the fuel and injects only a fraction of the total air in the FMFRR. Therefore, the FMFRR volume is only a fraction of the reactor volume proposed in U.S. Pat. No. 6,089,855. Lastly, the fuel lean flame gases are combined with the fuel rich flame gases to yield reduced exit NOx compared to that produced by the approach described in U.S. Pat. No. 6,089,855. Specifically, the FLR conditions are set to generate low temperature fuel lean flames, which produce carbon dioxide, water vapor and very low levels of NOx. In some URNB configurations, stability of the FLR flames is supported by hot products from the FMFRR. Both the FMFRR and FLR zone conditions are set to suppress NOx production. In the Burnout and NOx Reduction Reactor (BNRR), conditions are defined to react products together from the FMFRR and FLR so as to reduce NOx to very low final levels. As noted on FIG. 1$b$, heat (Q) is extracted and/or furnace gas (m) are utilized to control the BNRR zone temperature and maximize NOx reduction. This is in contrast to the approach described in U.S. Pat. Nos. 5,368,476, 5,073,106 and 5,022,849, where burnout zone temperature is not controlled. Low temperatures, where NOx reduction is maximized, can be achieved without concern for reaction extinction, because hot products from the FMFRR and FLR will help sustain the needed reactions. Importantly, the temperatures achieved in the BNRR, needed for maximum NOx reduction, are also the temperatures where the Selective Non Catalytic Reduction (SNCR) reaction of amine based species and NOx becomes active. This then creates the opportunity for injecting an amine type species into the BNRR to further reduce NOx. Furthermore, given the very low base of NOx produced in the BNRR, the amount of amine type species injected into the BNRR is minimized. This is in contrast to post combustion control systems with conventional burners, as described in U.S. Pat. No. 3,900,554, where the amount of amine reductant can be more than six times higher and six times more expensive than with the URNB.

The key to URNB performance, is to balance, over multiple reaction zones, all of the needed flame characteristics, such as good stability, low noise, good operability and turndown, high efficiency, good heat transfer and low NOx, CO and unburned hydrocarbon emissions. This is in contrast to many low NOx burners, and those highlighted in U.S. Pat. Nos. 5,603,906, 5,542,840, 5,460,512, 5,284,438, 5,259,755 and 5,257,927, where a single reaction zone has to achieve all objectives. With a new boiler or furnace design, these URNB processes can be fully integrated and optimized without the need for cooled flue gas to control temperature. With existing boiler or furnace designs, some cooled flue gas may be needed, as well as heat extraction. However, the amount of expensive flue gas needed will be significantly less than that needed for existing low NOx burners. Excellent performance can be achieved in both cases, that is superior to other low NOx burner approaches. Furthermore, with the URNB, amine type NOx reduction agents can be injected at low concentration to further enhance NOx control performance at good combustion conditions. Furthermore, the reduction potential of the injected amine species can be promoted by the addition of fuel and air.

It should be noted that, fuel type will influence the design and ultimate performance achieved. For example, a high nitrogen content oil will have considerable potential for fuel bound nitrogen NOx production. The burner design must address this potential. Even with an optimal design, NOx results with this fuel will be higher than those with natural gas. However, compared to conventional and typical low NOx burners, emissions of the URNB NOx will be very low.

1. System Goals

As noted above, low NOx is only one of the many important design goals of an energy system. URNB system goals should include:

Low NOx—<5 ppm

Low CO—<50 ppm

Low UHC—<50 ppm

High turndown—8 to 1

Good operability—smooth modulation of load without instabilities, noise, flashback Good stability—highly stable anchored flame at each setting and during transients Low noise—less noise than conventional burners Good heat transfer—good radiative heat transfer from the flame to the load Good flame radiation—solid flame detection signals Compact package—fits in existing boilers and installations Limited pressure drop—less than conventional burners Limited external flue gas need—little need for additional ducts, fans and controls 2. Flame Process Background Flame processes, driven by burner design, will determine if URNB goals can be achieved. Therefore, some background is given on flame processes.

When fuel and air are injected into a hot boiler or furnace, heat, radicals and oxygen will rapidly break down or partially oxidize the fuel into a range of hydrocarbon fragments, which upon further oxidation will react to form CO and $H_2$. In the presence of oxygen and at temperature, $H_2$ will rapidly convert to $H_2O$. However, the CO to $CO_2$ reaction is much slower, even in the presence of oxygen. In fact, if the gas temperature drops below 1500 F, CO will persist and exit the energy system without being converted to $CO_2$. This is a major problem for nonpremixed low NOx burner flames that utilize substantial FGR for temperature control. Besides the problem of CO burnout, some fuels and burners can create soot that can persist in the exhaust. Soot is produced by mainly aromatic type hydrocarbon fragments that condense and nucleate in the early flame zone. These precursors will grow and become large soot agglomerates, if conditions are appropriate. Limited oxygen at high temperature and sufficient residence time will cause soot to grow. If temperatures are sufficiently high and oxygen ultimately becomes available, the soot will burn and produce a strong radiation that is useful in transferring flame heat to the load. If the soot has sufficient residence time and available oxygen at temperature, it will completely burn out. If not, the soot will exit the system as a pollutant. Again, this is a problem with nonpremixed low NOx burner flames that are typically long and have low temperatures, particularly at the flame tip.

During the early and latter stages of the flame process, NOx can be generated. NOx production can be broken into thermal, prompt and fuel NOx processes. Prompt NOx is formed by the reaction of hydrocarbon fragments (e.g. CH, $CH_2$) with molecular nitrogen from the air. This process occurs early on, when the fuel is partially oxidized to hydrocarbon fragments. Prior to NOx formation, intermediate nitrogen containing compounds are formed (e.g. HCN, CN, NH, $NH_2$, $NH_3$) that, depending on the temperature and oxygen concentration, will either convert to NOx or convert back into molecular nitrogen. Given the initial need for hydrocarbon fragments to drive the first steps of the reaction, prompt NOx is maximized in fuel rich zones, either inside the fuel-rich cores of nonpremixed low NOx burner flames, or in global fuel rich zones. Of course, the fraction of intermediates eventually converting to NOx depends on the contacting of these species with oxygen in the downstream burnout zone. For early contact of these species with oxygen at high temperature, prompt NOx production will be maximized over conversion back to molecular nitrogen. This is the case with nonpremixed low NOx burner flames. With the URNB, a portion of the fuel rich reactor is used to optimally decay the NOx and nitrogenous species prior to exiting the reactor. Furthermore, downstream burnout conditions are optimized to react these intermediates with NOx at a temperature where total NOx is reduced. Lastly, amine type species can be injected into the downstream burnout zone to react with and further reduce NOx. Reaction of the injected amine species can be promoted by fuel and air injection. This is another novel feature of the URNB.

Thermal NOx is a simpler process, and is essentially driven by the interaction of oxidizing radicals (e.g. O, OH) in the hot flame zone with molecular nitrogen. Thermal NOx production is maximized by high temperature and high oxygen concentrations. If oxygen is limited, NOx production will be limited, even at very high temperature. In contrast to the more rapid prompt NOx reaction, the thermal NOx reaction is slow, both in terms of production and reduction, that should occur as temperature drops, Also, the thermal NOx process has a very high activation energy, that gives a strong variation with temperature. Therefore, lowering temperature substantially decreases thermal NOx. In contrast, prompt NOx varies more slowly with temperature, requiring large drops in temperature to achieve an equivalent reduction in prompt NOx. In the URNB, lean flames in the FLR are operated at a high excess air level, where temperatures and thermal NOx production are suppressed. Also, while temperatures are high in the FMFRR, oxygen levels are low, where thermal NOx is also suppressed.

Fuel bound NOx has some similarities to prompt NOx. However, unlike the prompt NOx process, the intermediate nitrogen compounds (e.g. HCN, CN, NH, $NH_2$, $NH_3$) are mainly derived from the attack of radicals on fuel nitrogen, not by the reaction of hydrocarbon fragments with molecular nitrogen. Therefore, the higher the fuel nitrogen content, the greater the fuel NOx potential. Once the nitrogenous intermediates are formed, the final steps to NOx, or back to molecular nitrogen, are similar to those of prompt NOx. As in the prompt NOx case, the fraction of fuel nitrogen that gets converted to NOx will depend on the oxygen and temperature conditions in the burnout zone. Low oxygen conditions in the FMFFR can be set to minimize fuel nitrogen conversion to Nox.

In the above discussion, flame NOx production processes are highlighted. These processes are typically invoked in the discussion of conventional and low NOx burners. Given that most burners operate with a single reaction zone, NOx production processes are the only ones that are mentioned. However, with the URNB burner, NOx reduction, as well as production processes, play a major role in the overall NOx performance of the burner. Certainly, in the case of post combustion NOx control systems, NOx reduction is the dominant process. The URNB burner, by maximizing NOx reduction as well as minimizing NOx production, achieves optimal NOx results with good overall combustion conditions.

NOx, like oxygen, is an oxidizer. Under conditions where oxygen is deficient, NOx will react with CO, hydrocarbon fragments and soot and be converted back into molecular nitrogen. Therefore, under fuel rich conditions, NOx can be reduced to nitrogen, which will be relatively unavailable for conversion to NOx in the downstream burnout zone. This will particularly be the case if burnout temperatures are low. These hydrocarbon and carbon based reduction processes are incorporated into the URNB design in the FMFRR and BNRR reactors.

Another path for NOx reduction is through the reaction of NOx with amine (e.g. NH, $NH_2$, $NH_3$) type species. Unlike the reduction processes described above, the amine type species will reduce NOx to molecular nitrogen even in the presence of oxygen. This phenomena is taken advantage of in the Selective Non-catalytic Reduction (SNCR) and Selective Catalytic Reduction (SCR) post combustion NOx control processes. In these approaches, ammonia ($NH_3$), or a like reactant, is mixed with the flue gas and reacted with the NOx in roughly stoichiometric proportions, to reduce NOx to molecular nitrogen. While the reduction reactions are similar in both approaches, the temperature where the ammonia needs to be injected is 1700 F in the case of SNCR. At significantly higher gas temperatures, the NOx is not reduced and ammonia can be oxidized to NOx. At much lower temperatures, the ammonia will not react, and both NOx and ammonia will exit the system. In the SCR case, a catalyst is used to promote the reduction reactions at temperatures as low as 600 F. Also, within the catalyst bed, much better mixing of gases and control of the reaction is achieved, resulting in NOx reductions of over 90%. With the SNCR case, theoretical reductions of over 90% are also possible. However, mixing, residence time and temperature limitations in existing systems results in practical NOx reductions of less than 50%.

While very effective, these post-combustion NOx reduction processes are very expensive, because of the need for injectors, reaction vessels and, in the case of SCR, a catalyst reactor. Furthermore, the process requires ammonia, a difficult to handle and expensive chemical reagent. In fact, to improve handling safety, urea, that converts to ammonia, is typically specified for use. This reagent, that is more costly than ammonia, can represent over 60% of the high cost of post combustion NOx control. Besides ammonia and urea, NOx reduction agents, such as cyanuric acid, ammonium sulfate or bisulfate, sulfite, bisulfite, formate, carbonate, bicarbonate, biuret, triuret, ammelide and mixtures of any other generator of amine type species can be utilized.

In the case of the URNB burner, the fuel rich reaction zone (FMFRR) is operated to produce amine type species, amounts of which depend on the fuel type and conditions. These species are then brought together in a reduced temperature burnout zone (BNRR), where they react with NOx produced in a fuel lean zone (FLR). The amine species then help to reduce the NOx to low levels. Since the burner generates the NOx reduction reagent in the URNB approach, then NOx reduction is achieved at low cost. This is a significant benefit of the URNB approach. When this process is combined with the additional NOx production control and NOx reduction processes, the URNB burner achieves low NOx at low cost. Furthermore, when an amine type species is injected into the URNB burnout zone, the amount required is far less than that required for SNCR and SCR devices. This is because the initial NOx is low with the URNB. Since reductant costs can represent 60% of the cost of chemical based NOx control, a factor of approximately six less in reductant needed with the URNB translates into a major cost savings. Furthermore, fuel and air can be injected into the zone to promote NOx reduction reactions. The fuel can reduce the local oxygen concentration and also promote the formation of radicals that participate in the NOx reduction chemistry.

As noted above, NOx production and reduction processes are diverse and each has to be optimized to achieve the needed low NOx levels. At the same time, these processes have to be balanced with those that achieve all the other needed burner performance characteristics. How this is achieved in the URNB is highlighted below in Section 4.

Besides emissions, flame processes also influence burner stability, turndown, noise and heat transfer. Burner flame stability is driven by processes occurring early in the flame. The initiation of fuel partial oxidation is a balance between heat input from the previously burned gases versus the heat extracted by the fresh reactants and any other elements, including cooled flue gas, etc. Therefore, methods that seek to control flame temperature, and thereby NOx, can destabilize flames. This is part of the problem with the reactor system described in U.S. Pat. No. 6,089,855, where cooled flue gas is recirculated in the reactor for NOx control. In the URNB, reactor temperature is maintained at a high enough level to optimize stability. If a flame is comprised of premixed gases and is overall fuel lean, then NOx can just be controlled by high excess air, that reduces temperature. However, to reduce NOx to very low levels, temperatures need to be driven down to where lean premixed flames are destabilized. Some very low NOx burners are of this type, and tests have shown that the burners operate on the edge of stability and blowout. In fact, some burners (e.g. U.S. Pat. No. 5,603,906) that achieve very low NOx operate close to what they refer to as the explosion limit. This is the point where flames blow out and an explosive unreacted mixture can build up in the boiler and be ignited by a spark. In contrast to this fuel lean flame case, if the flame is comprised of premixed gases that are overall fuel rich, NOx is suppressed due to a lack of oxygen. Therefore, temperatures do not have to be drastically lowered to control NOx. In this case good flame stability can be achieved in concert with low NOx. This is the URNB approach. Of course, the full NOx process has to be considered, which includes subsequent burnout under lean conditions. If this occurs at too high a temperature, excessive NOx will be produced. However, if the temperature is too low, then CO burnout will not be achieved. In the case of the URNB burner, the good stability of the rich higher temperature reaction zone is combined with a controlled temperature burnout zone to achieve optimal NOx control and low CO at good stability.

Typical lean premixed burners with massive flue gas recirculation for temperature and NOx control produce compact and low emissivity flames that have low NOx. However, besides stability problems, as highlighted above, these compact flames also have a high potential for acoustic coupling and noise. Since the flame is very localized, an acoustic wave moving back and forth in a boiler or furnace could perturb the flame in a periodic way. As heat release increases as the acoustic wave passes, energy is fed into the wave, due to expansion of the heated gases. This then drives the magnitude of the pressure wave higher, which then further increases the combustion rate. Ultimately, the combustion and pressure waves become tightly coupled and substantial noise and vibration are produced. Besides excessive noise, these processes can even damage equipment. Therefore, these processes have to be avoided. The URNB burner, by having multiple reaction zones, distributes heat release over a wider area, which then opposes acoustic coupling and noise. In addition, a portion of the hot gases from the FMFRR can be transported to the base of the lean flames to continuously ignite and stabilize lean flames. This also helps to reduce noise and vibrations.

Low NOx compact premixed flames are nearly soot free, transparent and produce relatively little radiative heat transfer. Therefore, in a conventional boiler, these flames reduce tube heat transfer, resulting in increased "back pass" and tube sheet gas temperature. These increased gas temperatures could ultimately result in damaged tubesheets, increased boiler maintenance costs and even a failed boiler. By introducing a relatively high temperature and fuel rich zone, soot and high radiation are produced by the URNB flame. This substantially increases heat transfer, relative to the nearly transparent low NOx lean premixed flames with massive flue gas recirculation. Besides having more normal heat transfer, the URNB burner also produces a strong flame signal, that can be easily detected by current flame safeguard systems. This is another benefit of the burner.

3. URNB Burner

Based on the above mentioned needed goals and an understanding of flame and NOx processes, a URNB burner was defined that meets all of the needed burner goals at low cost. The key to the overall excellent performance is the incorporation of multiple reaction zones that through interactions, optimally address all of the burner goal areas. By balancing all burner goals across several reaction zones, a complete performance optimization can be achieved. Unlike past NOx control methods that separately look at either burner NOx generation potential or post combustion NOx reduction, the URNB concept incorporates and optimizes both NOx production and NOx reduction processes in a single design to achieve very low NOx at good combustion conditions. The specific URNB design will depend on whether the burner is adapted to existing or new boiler/furnace designs. In addition, the design will vary with fuel type. However, the general concept applies well to all cases.

As will be illustrated below, in Section 5, the URNB burner can be designed with many reaction zones to achieve different objectives. However, for the purpose of illustration, only three zones are considered in the following discussion. These are the fuel modification fuel rich reactor zone (FMFRR), the lean flame zone (FLR) and the final NOx reduction and burnout zone (BNRR), as illustrated in FIGS. 1a and 1b. FIG. 1a illustrates the overall process, while FIG. 1b highlights specific flows of gases and heat. Processes occurring in each zone are now described.

Fuel Modification Fuel Rich Reactor (FMFRR)

Referring to FIG. 1b, in the FMFRR zone 18, fuel and air are injected at overall fuel rich conditions. The fuel can be natural gas, refinery gas, propane, oil, solid fuels, etc. In the environment with limited oxygen, the complex fuel molecules are partially oxidized to mainly CO and $H_2$. Because, oxygen is limited, reactor temperatures can be high and thermal NOx production will still be limited. This high temperature but low oxygen concentration condition helps to facilitate flame stability as well as produce low NOx, as highlighted above. Also, the high temperature and radiation will provide a strong radiation signal, which makes flame safeguard operation more positive, relative to other low NOx flames. Also, initial uniform mixing and reaction, or stirred flow, followed by plug flow in this zone destroys complex hydrocarbons that can escape other types of flames and become pollutants. With the FMFRR, mainly CO and $H_2$ exit the zone and are transported into the BNRR 22 burnout zone.

In the low oxygen atmosphere of the FMFRR 18 NOx production is substantially suppressed. However, prompt NOx processes also produce nitrogenous species, such as HCN and $NH_3$. This is illustrated in the FMFRR predictions given in FIG. 2. As shown, at an equivalence ratio of 1.3, HCN and NO are above 10 ppm, and $NH_3$ is above 30 ppm, giving a total nitrogenous species concentration of 60 ppm. If air were simply added to this mix downstream, without any reduction in temperature, the $NH_3$ and HCN would mainly convert to NO, and the existing NO would not be reduced. This would result in high NOx emissions relative to the goal. However, increasing the equivalence ratio to nearly 2.0 and allowing the reduction reactions to proceed under plug flows for an adequate residence time reduces NO, $NH_3$ and HCN substantially. In this case, the total nitrogenous species is under 10 ppm. For this case, oxidation of these species in a downstream zone would result in a much lower total NOx. However, the best approach to minimize downstream NOx production is to tailor the nitrogenous species production in the FMFRR 18 to complement and reduce the NOx produced in the FLR 20 lean flame zone. Also, in addition to producing the correct nitrogenous species mix, the CO and soot produced in the FMFRR 18 can be tailored to assist NOx reduction in the downstream zone. Specifics of these reduction processes are discussed below.

The above predictions and comments address the case where fuel bound nitrogen is small or zero. This covers many fuels of interest. For cases where there is considerable fuel nitrogen, reaction in the FMFRR 18 will reduce the nitrogen to mainly molecular nitrogen, as noted above. However, the remaining NO, HCN and $NH_3$ will exceed that shown in FIG. 2. Therefore, conditions will have to be adjusted in the FMFRR 18 and downstream zones to minimize overall NOx for this case. The same basic principals should be followed to optimally control NOx at good combustion conditions. However, even at optimal conditions, the total NOx for the fuel bound nitrogen case will exceed that for the non fuel bound nitrogen case.

The gases that exit the FMFRR 16 zone will mix with oxygen containing FLR 20 product gases and release heat in the BNRR 22. This stretches out heat release, that will then have a reduced potential for acoustics coupling, as noted above. This is very beneficial to avoiding noise and vibrations. While the flame is stretched out relative to a low NOx lean premixed burner, the URNB rich flame is shorter than a conventional flame, as a result of good individual zone mixing and a downstream jet design that can more rapidly mix gases than a conventional single jet flame. Therefore, low noise potential is achieved, in a compact overall flame length.

The extended flame will have high temperature soot, that will increase the emissivity and heat transfer from the flame. This will be beneficial to heat transfer, relative to lean premixed low NOx burners. With the URNB, flame heat transfer will be more conventional than with other low NOx burners.

As noted above, the FMFRR 18 operates at a higher temperature than typical low NOx burner flames. As load is reduced, the extra temperature is beneficial in maintaining stability at the lower loads. Also, with the higher temperature, the decay of nitrogenous species and NOx are enhanced. In contrast, other low NOx burners need significant adjustments in flue gas to maintain stability at low loads. Also, because many of these burners are premixed at lean nearly stoichiometric conditions, flashback becomes a limitation. With the URNB, fuel rich mixed conditions will limit flashback, and wider turndown of the FMFRR 18 should be expected.

In summary, the FMFRR 18 stabilizes the burner, produces a highly detectable flame, creates an extended luminous flame that has good heat transfer and acoustic properties. Also, the maintenance of high temperature and plug flow conditions in the end part of the FMFRR 18 decays both NOx and nitrogenous species levels to those needed for optimal reaction downstream. Importantly, the processes in the FMFRR 18 control NOx and generate nitrogenous species, CO and soot, that will assist NOx reduction in downstream regions. Lastly, the hot gases 16 from the FMFRR 18 promote ignition and stabilization of downstream reaction zones. This is important to FLR 20 and BNRR 22 zones, which could have reaction quenching, if the FMFRR 18 hot gases were not present.

Fuel Lean Reactor (FLR) Flame Zone

As shown in FIG. 1b, lean premixed flames in the FLR 20 are generated in parallel with the FMFRR 18 reaction. Lean premixed flames minimize NOx by controlling temperature with excess air, to suppress thermal NOx, and operating overall fuel lean to control prompt NOx. FIG. 3 shows NOx predictions and data for lean premixed flames as a function of equivalence ratio. As shown, NOx is reduced as equivalence ratio is reduced. This result is complementary to the FMFRR 18 behavior, where increasing the equivalence ratio reduces NOx. Therefore, bringing together FMFRR 18 and fuel lean flame gases from the FLR 20 will result in low NOx and complete burnout of the fuel. As shown in FIG. 3, NOx can be driven to very low levels with lean flames. This supports that more of the fuel should be burned in the lean flames. However, the correct ratio of FMFRR 18 to FLR 20 fuel is governed by the burnout flame processes, where the FMFRR 18 and lean gas products mix and combustion is completed. This will be addressed below.

A major deficiency of typical low NOx lean premixed flames is their reduced stability and acoustics coupling. However, in the URNB burner, the hot gases from the FMFRR 18 can be used to continuously heat and ignite the lean fuel and air mixture. This can be accomplished by directed hot gas jets from the FMFRR or indirectly by diffused hot gases within the boiler or furnace. Therefore, lean flame stability with the URNB is good. Also, because the fuel rich gases stretch out the flame, the poor acoustic characteristics of lean flames are mitigated by the FMFRR 18 stretched out flame and burnout processes. Therefore, the benefits of lean flames can be achieved in the URNB burner without the negative aspects common in low NOx lean premixed burners.

The lean premixed flames achieve low NOx without flue gas recirculation, because the extra air dilutes the flame gases and controls temperature and NOx. However, as the lean products 24 mix with the FMFRR 18 and gases 16, the gases reach near overall stoichiometric conditions. If heat has not been extracted from the gases, or diluents not mixed with the gases, then temperatures can rise to high levels, where NOx can be produced. Therefore, prior to the burnout zone 22, heat must be extracted from the gases or the gases diluted 16 and 24, as illustrated in FIG. 1b. With the lean flame gases 24, heat extraction can be facilitated. The lean burned gases will have significant oxygen content and will be at a modest temperature, compared to normal flames. Also, the gases will not contain any CO or unburned hydrocarbons. Therefore, these gases can be directed at a cooled surface, to lose heat, prior to mixing with the FMFRR gases. Because of gas conditions, this can be accomplished without concern for degrading the surface, as in the case with a conventional flame. Also, lean flame jets can be configured to entrain furnace gas prior to mixing with the FMFRR 18 gases. This will also reduce burnout temperature and help suppress NOx.

As load is reduced, lean flame stability is reduced for typical low NOx burners. However, in the URNB case, the rich FMFRR 18 reactor will continue to ignite the lean gases. Also, the stoichiometry of the lean FLR 20 flames could be adjusted to enhance stability. The burnout zone would then have to take up more of the burden for NOx control. However, at low loads and low temperatures, NOx will be lower, giving more flexibility for adjusting conditions. Another load following approach for a URNB with multiple FLRs 20 would be to stepwise shut down individual FLRs as load is reduced. This would allow remaining FLRs to operate under more consistent conditions.

In summary, the FLR 20 lean flame zone burns the majority of the fuel at very low NOx and produces a gas that is favorable for heat extraction by convective cooling. While the stability and acoustic characteristics of this type of flame would be problematic in a typical low NOx burner, the presence of the FMFRR 18 product gases 16 helps to continuously ignite and stabilize the lean flames and adds good burnout zone acoustic characteristics to the overall combustion. Lastly, although the lean flames produce low NOx, a combination of FMFRR 18 and lean flame FLR 20 gases in the burnout zone can produce the lowest NOx. Lastly, injecting an amine type reductant and fuel and air in the burnout zone would further lower NOx. This is discussed below.

Burnout and NOx Reduction Reactor (BNRR) Zone

As shown in FIG. 1b, the lean flame FLR 20 products and FMFRR 18 product gases are brought together in the BNRR 22 burnout flame zone, where all fuel components are completely oxidized. Besides fuel component burnout, this zone is optimized to further reduce and minimize NOx. As noted in the figure, heat is extracted, or gases are diluted with cooled flue gas, steam, etc., to control the final temperature of the burnout zone. As shown in the predictions in FIG. 4, NOx emissions across the burnout flame are high if temperature is not controlled. This is denoted by the case "without" temperature control. However, if temperature is reduced, as illustrated by the heat extraction case in FIG. 4, denoted "with" temperature control, then NOx can be reduced to below 5 ppm. This is a result of the special processes in the URNB burnout zone.

As noted above, the FMFRR 18 produces gases with a mix of NO, HCN and $NH_3$. Also, the gases contain CO and soot, which are NOx reductants, at the proper temperature and oxygen conditions. In contrast, the FLR 20 lean flames produce a high oxygen content gas with just NOx. If these two gases are brought together at the right temperature and at the right mixing rate, NOx reduction processes, like those in the post combustion control SNCR, can be activated to reduce NOx to very low levels, as illustrated by the results in FIG. 4. A combination of amine species NOx reduction, as included in the predictions, and CO and soot NOx reductions will lead to the needed NOx reduction. As noted above, if the burnout zone temperature is too high, the amine species will oxidize to NOx. Also, if the temperature is too low, then the amine species can even exit the system unreacted. Therefore, temperature control in the BNRR 22 burnout zone is important for optimal results.

The final BNRR 22 burnout and NOx reduction zone is key to the very low final NOx levels produced by the burner. Also, conditions where NOx can be optimally reduced can be achieved in the burnout zone, because fuel ignition and flame stability occur elsewhere and the only criteria on the burnout zone is CO burnout. As noted above, this requires temperatures above 1500 F, allowing the 1700 F temperature, which is optimal for the amine NOx reduction reactions under oxygen rich conditions.

In the above BNRR 22 process discussion, all of the NOx reduction agents for the burnout zone were highlighted as coming from the FMFRR 18. However, as noted earlier, it is possible to augment these reductants by injecting amine species and fuel and air directly into the BNRR 22. The addition of amine species could help supplement that coming out of the FMFRR 18. As noted previously, there is an optimal ratio between amine species and NOx to achieve maximum NOx reduction.

Also, the addition of hydrocarbon fuel can broaden the temperature range over which the NOx reduction process is maximized. In addition, the fuel itself can act as a reductant of Nox in a reburning type process, if conditions are sufficiently fuel rich. Therefore, besides the direct reduction of NOx by reaction with hydrocarbons, injections of fuel will help optimize the amine species NOx reduction process. The downstream air injection in the BHNRR 22 is simply used to oxidize any remaining fuel components, as required. It should be noted that these additional injected reactants may be of most interest for fuel cases that have fuel bound nitrogen, or that tend to produce higher flame temperatures and NOx, then natural gas combustion. For the clean natural gas case, these additional reactants may not be required.

In summary, the BNRR 22 burnout and NOx reduction zone conditions can be set to bring together the FMFRR 18 and lean flame FLR 20 gases for optimal NOx reduction, without concern for impacts on stability, acoustics and turndown, which are controlled by the FMFRR 18 zone. Also, the majority of the fuel can be burned under low NOx conditions in the FLR 20, because of the stabilizing influence of the FMFRR 18. As described, the URNB design creates several reaction zones that each have unique characteristics that act cooperatively to optimize NOx, burnout, stability, noise, turndown, heat transfer and flame detection. While the above URNB discussion used a simple three zone illustration, it is clear that several additional zones could be incorporated using the same principals as above to achieve optimal performance for a wide range of applications. Specific burner designs using the URNB concept are illustrated below.

4. URNB Drawings

The figures described below illustrate several process and apparatus configurations that utilize the URNB concept. These are not extensive, and other configurations and designs could be envisioned by one skilled in the art.

FIGS. 1a and 1b presents a simple URNB process, where a FMFRR 18 zone (equivalence ratio>1) produces rich product gases from a mixture of fuel (f) and air (a) and FLR 20 lean flame zones (equivalence ratio<1) created by a mixture of fuel (f) and air (a) simultaneously produce lean gases that are then brought together in the BNRR 22 burnout and NOx reduction zone (equivalence ratio<1). As shown, heat (Q) can be extracted and diluents (m) (e.g. recirculated flue gas, steam) added at various locations 16, 24 and 26 to control temperature. Also, a NOx reductant (e.g. $NH_3$), or fuel (f) and air (a) 26, can even be added in the burnout zone to optimize emissions and combustion. The fuel and air coming into each zone can be premixed, near premixed or even nonpremixed, depending on fuel and application.

FIG. 5 presents a URNB process, where FMFRR zones are serially aligned and produce rich product gases and lean FLR flame zones are serially aligned and simultaneously produce lean gases that are then brought together in the BNRR burnout and NOx reduction zone. The purpose of having two serial FMFRR reactors is to optimize conditions in the first FMFRR reactor for flame stability and optimize conditions in the second FMFRR reactor for NOx suppression and downstream emissions reductions. For example, the first reactor could be less fuel rich, for better flame stability and the second reactor could be more fuel rich for improved NOx control. By separating FMFRR reactors, a more mixed initial reactor for optimal stability could be followed by a more plug flow reactor for optimal nitrogenous species decay and NOx control. Also, the purpose of having two serial FLR reactors is to optimize conditions in the first FLR reactor for early reaction and stability, while helping to ultimately ignite reactions in the second reactor that are optimized for NOx reduction. For example, the first FLR reactor could be less fuel lean for good stability and the second FLR reactor could be more fuel lean for improved NOx control. Furthermore, as shown, NH3 or other amine producing type species could be injected into the second FLR reactor to reduce NOx prior to the BNRR. This could be important for some fuels, particularly those with high bound nitrogen content. In this case, the initial NOx production, even at limited temperature, could be high. After further temperature reduction to approximately 1700 F, NH3 could be injected to reduce NOx. As shown, heat can be extracted and diluents (e.g. recirculated flue gas, steam) added at various locations to control temperature. Also, a NOx reductant (e.g. NH3), or fuel and air, can even be added in zones to optimize emissions and combustion. As noted above, the presence of hydrocarbons tends to broaden the temperature band where NOx reduction agents are effective. The fuel and air coming into each zone can be premixed, near premixed or even nonpremixed, depending on fuel and application.

FIG. 6 presents a URNB process, where FMFRR zones are aligned in parallel and produce rich product gases and FLR lean flame zones are aligned in parallel and simultaneously produce lean product gases that are then brought together in the BNRR burnout and NOx reduction zone. As in the discussion for FIG. 5, the multiple FNFRR reactors can be set at conditions to optimize stability and NOx control separately. Likewise, the FLR reactors are also set to optimize stability and NOx control separately. By extracting heat from these reactors separately and in parallel and mixing all products together in the BNRR, chemistry in the BNRR can be optimized for minimal NOx at good combustion characteristics. As shown, heat can be extracted and diluents (e.g. recirculated flue gas, steam) added at various locations to control temperature. Also, a NOx reductant (e.g. NH3), or fuel and air, can even be added in zones to optimize emissions and combustion. The fuel and air coming into each zone can be premixed, near premixed or even nonpremixed, depending on fuel and application.

FIG. 7 presents a URNB process, where FMFRR zones are aligned in parallel and produce rich product gases that are brought together in another FMFRR zone (equivalence ratio>1) and FLR fuel lean flame zones (equivalence ratio<1) are aligned in parallel and simultaneously produce lean gases that are brought together in another FLR lean reactor (equivalence ratio<1), FMFRR and FLR lean gases then brought together in the BNRR burnout and NOx reduction zone (equivalence ratio <1). The purpose of the FMFRR configuration is to promote secondary reactions of fuel rich products to better control nitrogenous species formation ahead of the BNRR burnout zone for optimal NOx control. The purpose of this FLR configuration is to obtain a uniform mix of gases for NH3 reductant reactions prior to final reaction in the BNRR burnout zone. This will be of particular interest for high bound nitrogen content fuels, where high FLR initial NOx might be expected. As shown, heat can be extracted and diluents (e.g. recirculated flue gas, steam) added at various locations to control temperature. Also, a NOx reductant (e.g. NH3), or fuel and air, can even be added in zones to optimize emissions and combustion. The fuel and air coming into each zone can be premixed, near premixed or even nonpremixed, depending on fuel and application.

FIG. 8 presents a URNB process, where FMFRR zones are aligned in parallel and produce rich product gases that are brought together in another FMFRR zone (equivalence ratio>1) and then these gases are brought together in another FMFRR zone (equivalence ratio>1), FLR lean flame zones are aligned in parallel and simultaneously produce lean gases that are brought together in another FLR lean reactor (equivalence ratio<1) and these gases are brought together in another FLR lean zone (equivalence ratio<1), FMFRR and lean gases then brought together in the BNRR burnout and NOx reduction zone. The purpose of the FMFRR and FLR configuration is to balance fuel rich and fuel lean reactions over several steps that include heat extraction, dilution and NH3, fuel and air injection, to maximize emissions control as well as all other burner performance goals. As specifically shown, heat can be extracted and diluents (e.g. recirculated flue gas, steam) added at various locations to control temperature. Also, a NOx reductant (e.g. NH3), or fuel and air, can even be added in zones to optimize emissions and combustion. The fuel and air coming into each zone can be premixed, near premixed or even nonpremixed, depending on fuel and application.

In all of the above configurations, at least one of the FMFRR zones can be operated at an equivalence ratio in the range of approximately 1.8 to 2.0 and one of the FLR lean zones can be operated at an equivalence ratio in the range of approximately 0.5 to 0.6. Also, in all of the above configurations, the BNRR burnout zone can be operated at an equivalence ratio of under 1.0 at a temperature in the range of approximately 1600 F to 1800 F. In addition, in all of the above configurations, the zones can be separated by solid walls or by aerodynamic means, including the use of the furnace gas or injected recirculated flue gas as a separating medium.

FIG. 9 presents a URNB burner design that is comprised of a single central FMFRR chamber 28 surrounded by a multiplicity of lean burner jets 30 that generate FLRs downstream and produce individual flames that are ignited by the hot gases exiting from the FMFRR zone. The lean flame gases entrain cooler furnace gas before completely mixing with the FMFRR gases and completing combustion in the BNRR burnout zone, which occurs downstream of the burner exit in the boiler or furnace volume. Fuel and air are well mixed prior to reacting in their respective zones. For further temperature control, flue gas could be included in the combustion air or injected separately between jets or into jets as they exit into the boiler or furnace volume. Also, ammonia or a like NOx reductant could also be injected into the burnout zone, for additional NOx reduction. Also, as needed, fuel and air could be injected into the burnout zone from discrete jets installed at the burner exit. As described above in Section 4, this could facilitate NOx control, particularly with challenging fuels. Special design features of the burner include several gas spud 32 and mixing air supply pipes 34 to inject a premixed rich mixture of fuel and air into the FMFRR. Multiple injectors 36 offset from the axis and FMFRR exit are used to create recirculation and positive ignition of the mixture, without flashback. While injectors 36 can be run at equal equivalence ratios for optimal NOx, one or more could be operated at a lower equivalence ratio to further enhance stability. This would produce an effect similar to the process illustrated in FIG. 6. For selected high turndown applications, some FMFRR jets 36 could even be closed off with dampers 38 to maintain the needed high exit gas velocity as load is reduced for flashback prevention in active FMFRR jets. The axially aligned FMFRR jets 36, illustrated in FIG. 9, ultimately create a plug flow zone ahead of the exit, where NOx and nitrogenous species decay are optimized. The FMFRR is lined with refractory insulation 40 that is resistant to fuel rich gases, to protect metallic components of the burner. Surrounding the burner is an air passage 42 for the lean jets, that serves as active cooling for the FMFRR to prevent metal degradation. Of course, cooling is controlled by the refractory thickness 40 to achieve the needed optimal temperature for NOx and nitrogenous species decay. The FLR air passage ultimately couples with the lean gas spuds 44, where a mixture of fuel and air is premixed in the lean jets before being injected into the boiler or furnace to create the FLR zones. In this drawing, four lean jets 30 are shown. However, one or more lean jets can be utilized, depending on the application. Symmetric or nonsymmetric FLR jet patterns can be considered. The exit velocities of the FLR jets are high enough to avoid flashback, even at low loads. For selected high turndown applications, some FLR jets could even be closed off with dampers as load is reduced to maintain the needed high velocity for flashback prevention in the active FLR jets. The lean jets 30 can be oriented to entrain furnace gas or scrub the cooled boiler or furnace walls, or both, to reduce burnout flame temperature. Also, different equivalence ratios can be used in each lean jet 30 to get a proper distribution of fuel lean mixtures with downstream distance. This would produce an effect similar to the process illustrated in FIG. 6. Circular, rectangular, or other jet configurations can be utilized, depending on the application. Likewise, the FMFRR exit jet 46 could have various orientations and geometries. For example, the FLR jets could be oriented outwards to increase heat transfer with the boiler or furnace walls, while delaying mixing and burnout with the FMFRR jet. Also, the FMFRR could also have multiple jets. As shown in the figure, non circular jets 30 and 46 aligned parallel to the burner axis are used to get the proper furnace gas entrainment versus burnout zone jet merging. The key to FLR 30 and FMFRR 46 exit jet design is to incorporate the needed number, configuration and placement of jets to entrain sufficient cooled product gases prior to jet merging to yield the required temperature for the needed NOx control. Of course, the temperature must also be sufficiently high to achieve all of the other important burner performance characteristics (e.g. stability, turndown, noise, heat transfer, CO and unburned hydrocarbon emissions). The correct jet design will also depend on the boiler or furnace volume design and product gas temperature. While classes of boiler will work well with a given burner design (e.g. firetube boilers), as boiler or furnace design is altered, the burner jet design must be altered to achieve optimal performance. For example, a furnace with high temperature product gas, such as a steel forging furnace, would require more furnace gas entrainment before jet merging, and thereby a wider spacing of jets than that required for a low furnace gas temperature firetube boiler.

As illustrated in FIGS. 9A, 9B and 9C, the FLR jets 30 are similar and symmetrically aligned about the central FMFRR jet. This is reasonable for a firetube boiler geometry. However, for a non-cylindrical furnace or boiler geometry, the FLR jets could be aligned in a nonsymmetrical pattern about the FMFRR. For example, for a rectangular furnace geometry, the FLR jets could be located mostly above the FMFRR jets and closer to the furnace exit. This could improve product gas entrainment into the FMFRR jet 46 and thereby reduce temperature and improve NOx reduction in the BNRR zone. Specific configurations will depend on the boiler or furnace application of interest. Application of jet entrainment mixing models can be used to define the jet configurations yielding the best performance for the given application. Also, further temperature control can be achieved by introducing cooled flue gas into all of the combustion air 48 or separately into FMFRR, FLR and/or BNRR zones. Lastly, a NOx reduction agent, such as ammonia or like compound, could be injected separately or coinjected with flue gas into the BNRR.

Controls for the burner are similar to those for conventional burners. Dampers 38, that would be controlled by motor driven linkages, can be used to vary air flow to the FLR or FMFRR mixing tubes as load changes. This would be of interest to maximize stability and minimize flashback as load is reduced. Since temperature and NOx are naturally reduced as load is decreased, then burner rich and lean zone stoichiometries can be adjusted, by varying air flow, to achieve the needed stability and flashback performance. For example, as load is reduced, the FMFRR rich zone can be made less fuel rich and the FLR lean zone can be made less fuel lean. This should improve stability at the reduced load and temperature conditions. However, the changes must not cause the FMFRR and FLR flashback potential to be excessive. Each application and turndown needs to be examined separately and the correct turndown strategy applied. The URNB, by having multiple reaction zones is very flexible and allows this optimization of zone mixture ratios with load. Flame ignition for the burner can be achieved with conventional pilots 50 in the FMFRR. Also, flame detection, in the FMFRR, can be achieved with conventional flame detectors 52. In addition, for positive and continuous ignition of the lean FLR jets, some of the hot gases in the FMFRR could be channeled through small passages in the FMFRR nozzle 54 to impinge on the FLR jets and promote positive ignition. Only a small fraction (e.g. 5%) of the FMFRR product gas would be needed for this purpose. Lastly, for designs where FMFRR and FLR product gases are initially totally separated, separate pilots and flame detectors would be needed for both FMFRR and FLR zones.

FIGS. 10A and 10B show a URNB burner design, that is similar to that in FIG. 9A, and which is comprised of a single central FMFRR 56 surrounded by a multiplicity of lean burners 58 that function as the FLR and produce individual flames that are ignited by the hot gases exiting from the FMFRR zone. The lean flame gases entrain cooler furnace gas before completely mixing with the FMFRR gases and completing combustion in the BNRR burnout zone. Fuel and air are well mixed prior to reacting in their respective zones. For further temperature control, flue gas could be included in the combustion air duct 60 or injected separately between jets or into jets as they exit into the boiler or furnace volume.

Also, ammonia or a like NOx reductant could also be separately injected or coinjected with flue gas into the burnout zone, for additional NOx reduction. Special design features of the burner include several gas spud injectors 62 downstream of a swirl mixer 64 that rapidly mixes fuel and air together to inject a nearly premixed fuel rich mixture into the FMFRR. High swirl of the air creates recirculation and positive ignition of the mixture. While spuds 62 can be run at equal fuel flow for optimal NOx, one or more could be operated at a lower equivalence ratio to further enhance stability. The reactor length is sufficiently long to establish a plug flow like character prior to the exit 66. With this type of flow, NOx and nitrogenous species decay are optimized. The FMFRR is lined with insulation 68 resistant to rich gases to protect metallic components of the burner. Surrounding the burner is an air passage 70 for the lean jets, that serves as an active cooling of the FMFRR. Cooling rate is controlled by insulation 68 thickness to optimize NOx and nitrogenous species decay. This air passage ultimately couples with the lean gas spuds 72, where a mixture of fulel and air is premixed before being injected into the boiler or furnace to create the FLR. In this drawing, four lean jets 58 are shown. However, one or more lean jets can be utilized, depending on the application. The lean jets 58 can be oriented to entrain furnace gas or scrub the cooled boiler or furnace walls, or both, to reduce BNRR burnout flame temperature. Also, different equivalence ratios can be used in each lean jet 58 to get a proper distribution of lean fuel mixtures with downstream distance. Circular, rectangular, or other lean jet configurations 58 and rich jet 66 can be utilized, depending on the application. Likewise, the FMFRR exit jet could have various orientations and geometries. Also, the FMFRR could also have multiple jets. As shown in the figure, circular jets aligned parallel to the burner axis are used to get the proper furnace gas entrainment versus burnout zone jet merging for this overall geometry.

FIG. 11 presents a URNB burner design that is comprised of a single central FLR lean burner 74 surrounded by an FMFRR 76. The FMFRR gases entrain cooler furnace gas before completely mixing with the lean gases and completing combustion in the burnout zone. Fuel and air are well mixed prior to reacting in their respective zones. For further temperature control, flue gas could be included in the combustion air 84 or injected separately between jets 74 and 88 or into jets 74 and 88 as they exit into the boiler or furnace volume. Also, ammonia or like NOx reductant could also be injected into the burnout zone, for additional NOx reduction. Special design features of the burner include a combustion air swirler 78 and gas spud injectors 80 to inject a nearly premixed rich mixture into the FMFRR. The high swirl helps to stabilize the FMFRR. The FMFRR is lined with insulation 82 resistant to rich gases to protect metallic components of the burner. Surrounding the burner is an air passage 84 for the lean jets and FMFRR, that serves as an active cooling of the FMFRR. This air passage ultimately couples with the lean gas spud 86 and FMFRR gas spuds 80. Circular, rectangular,. or other jet configurations 74 and 88 can be utilized, depending on the application. Likewise, the FMFRR exit jet could have various orientations and geometries. In this configuration, a single axial oil fuel injector can be easily incorporated into the design. Besides BNRR temperature control by furnace gas entrainment, cooled flue gas could be injected into the combustion air or separately injected into FMRR, FLR or BNRR zones. Lastly, a NOx reduction agent, such as ammonia or a like compound, could be injected separately or coinjected with flue gas into the BNRR zone.

FIG. 12 is similar to the design in FIG. 11, except that the design in FIG. 12 has an FMFRR 90 design that has discrete fuel rich jet 92 injection, that is used to stabilize the flame. The center lean burner uses a combustion air swirler 94 to stabilize the flame. As in the burner illustrated in FIG. 11, this burner has the potential to include a single oil injector along the axis. In this embodiment, the lean burner 95 stabilizes the overall combustion FIG. 13 is similar to the design illustrated in FIG. 9. However, in this design, a separate flue gas channel is incorporated into the design to inject flue gas 96 near the discrete lean jets near the exit. The cooled recirculated flue gas is brought into the burner through a separate pipe 98 and is then channeled 100 to the front of the burner where it forms a parallel jet near the lean FLR jets. By being in close proximity to the FLR jets 30, flue gas is quickly entrained and dilutes the FLR products prior to merging with the FMFRR jet. This will suppress the burnout temperature and NOx. To ensure positive ignition and stability of the FLR jets, the flue gas jets could create a gap on the inside of the FLR jets where the hot FMFRR gases will ignite the FLR jets. Besides having an annular flue gas jet 96, discrete flue gas jets surrounding the FLR jets, could be incorporated into the design. The specific design will depend on the NOx level required, and furnace or boiler configuration and furnace gas temperature. Jet entrainment models can be used to help design flue gas, FLR and FMFRR jet configurations for the application of interest. Lastly, NOx reduction agents, like ammonia, could be injected into the flue gas 98 to then be carried into the burnout zone. This could further optimize NOx control. A NH3 to NO molar ratio of approximately one would be effective.

FIG. 14 is similar to the design illustrated in FIG. 9. However, in this design, a separate flue gas channel 102 is incorporated into the design to inject flue gas 104 into the FMFRR near the exit. In this case, the flue gas is brought into the burner and channeled towards the exit, as in the design of FIG. 13. However, in this application, flue gas exit ports 104 are formed in the inner wall of the channel, and the flue gas flows into the FMFRR as an inwardly directed annular jet that blankets the FMFRR nozzle 54. The direction and velocity of the annular jet are such so as to avoid large scale mixing of the flue gas in the early part of the FMFRR. This is needed to optimize the stability of the FMFRR, while suppressing NOx in the BNRR zone. Besides cooling the burnout zone, injection of the flue gas will cool down the FMFRR exit nozzle 54 and improve its service life. Lastly, NOx reduction agents, like ammonia, could be injected into the flue gas 98 to then be carried into the burnout zone. This could further optimize NOx control.

FIG. 15 is similar to the design illustrated in FIG. 9. However, in this design, a separate flue gas channel is incorporated into the design to inject 106 flue gas between the discrete lean jets 30 and the FMFRR jet 46. In this case, the flue gas is brought into the burner and channeled towards the exit, as in the design illustrated in FIG. 13. However, instead of flue gas jets in the vicinity of the FLR jets, the FMFRR exit nozzle piece is formed with passages that channel flue gas to discrete jets 106 that lie between the FLR 30 and FMFRR 46 jets. In this approach, the flue gas provides a separating barrier between the FLR and FMFRR jets. This delays jet merging and lowers the BNRR temperature and NOx emissions. Also, by injecting flue gas 106 away from FLR 30 jets, initial stability and reaction of these jets are not disturbed. In another approach that is similar to the design illustrated in FIG. 15, the flue gas could be brought close to the FMFRR exit nozzle, to mix with the FMFRR gases and reduce the burnout zone temperature. Besides discrete jets immediately surrounding the FMFRR exit jet 46, an annular flue gas jet could be incorporated around the FMFRR exit jet 46. Again, jet entrainment models would be needed to define the best flue gas, FLR and FMFRR jet configurations for this case. Lastly, NOx reduction agents, like ammonia, could be injected separately into the FMFRR zone or into the flue gas to then be carried into the burnout zone. This could further optimize NOx control.

FIG. 16 is similar to the design illustrated in FIG. 9. However, in this design, the FMFRR reactor 28 is further extended into the boiler tube 108, to increase rich reactor residence time and isolate lean reactor gases 110, produced by lean jets 30, for direct and improved heat transfer with the cooled boiler walls 108. In this case, the FMFRR has a long residence time that should benefit rich reactor NOx reduction, as per the discussion in Section 4. Importantly, the FLR lean product gases 110 are trapped between the outside of the FNFRR and the cooled boiler wall. These gases will cool before merging with the FMFRR gases at the end of the burner. Therefore, BNRR temperature and NOx will be low, even without flue gas. At the end of the FMFRR, rapid swirling exit ports 112, oriented partially in a tangential direction, are included to rapidly mix the FMFRR and FLR gases and burn up any remaining fuel components. Lastly, NOx reduction agents, like ammonia, could be injected 114 into the burnout zone, from the end of the burner. This could further optimize NOx control. Unlike the burner design illustrated in FIG. 9, the extended FMFRR 28 design will have a portion of the rich reactor exposed to hot FLR gases 110 from the outside. This portion of the FMFRR could also be air cooled by channeling the rich jet combustion air down to the end of the burner extension and back through an annulus that surrounds the ex tension. This will control temperatures and improve the durability of the burner. Another approach would be to use an uncooled refractory design that is supported by the boiler tube. This design, although simpler than the air cooled design, will not be as resistant to internal leaks as the air cooled design that has a sealed metal shell.

FIG. 17 is similar to the design illustrated in FIG. 16. However, in this design, the FMFRR reactor is more modestly extended into the boiler tube, and either air or water active cooling 116 is used at the exit of the FLR jets 30 to reduce FLR gas temperature prior to mixing with FMFRR products. The water active cooling, and even the air cooling, could be coupled to the boiler water system, to maximize efficiency. The cooled sur faces encircle the FMFRR 28 as well as protrude as fins or tubes 116 into the FLR gases to rapidly cool them to the required temperature. This cooling will reduce or eliminate the need for flue gas. Lastly, NOx reduction agents, like ammonia, could be injected into the burnout zone from the end of the burner 118 to further optimize NOx control.

FIG. 18 illustrates a system design, where the burner is integrated with a new boiler 120 or furnace design, where the FLR lean 310 and FMFRR 28 segments of the burner are isolated and individually cooled by water backed or air cooled walls. As shown, a separate water cooled tube is created for each FLR 30 and FMFRR 28. For the particular illustration, four FLR 30 and one FMFRR 28 zones are included. The FLR tubes are unlined and are designed to extract the needed heat from the FLR product gases. The FMFRR tube is lined with a refractory 122 resistant to rich product gases. Because FMFRR an d FLR flames are initially isolated, separate flame ignition and detection systems are needed for each zone. Temperatures of these gases are maintained at a higher level to promote the needed reactions for optimal NOx reduction. In this burner case, rather than flue gas controlling temperature, heat is extracted by active cooling 124 in the special boiler tubes. At the end of the rich and lean zones, a chamber 126 is located that has lean jet entrances 128 configured to produce swirl and rapid mixing of the fuel rich and lean gases to ensure good NOx reduction as well as effective burnout. As shown in the figure, the lean jets 128 are oriented with a tangential as well as radial component to ensure good mixing of FLR and FMFRR product gases. In this design, a NOx reduction reagent, such as ammonia or a like compound, could also be injected into the burnout chamber 126 to maximize NOx reduction. Given the freedom of a new boiler design, the mixing of FMFRR and FLR gases and the NOx reduction agent can be fully optimized. Also, fuel and/or air can be added in the burnout zone 126 to broaden the temperature over which the NOx reduction agent is effective. During load reductions, the equivalence ratios of the lean 30 and rich 28 jets could be varied to maintain flame stability. In addition, individual lean jets 30 could be shut down as load is reduced, to ensure flame stability and avoid any flashback at very low loads. To specify the FLR and FMFRR tube configurations, tube wall heat transfer models could be utilized.

It should be noted that the designs illustrated in the above mentioned figures, while not referencing multiple burner applications, are also suited for multiple burner applications, including those with a common windbox. While the figures suggest that lean and rich jets, of whatever number, are situated together, it should be noted that spacing of these jets will depend on the application. In particular, multiple burner and common windbox boilers or furnaces might have asymmetric arrangements of jets or rows of jets that are of one type. These arrangements could have performance and cost benefits in different application, and the illustrations included herein are not meant to restrict the application of the concept in any way.

5. Test Results

Substantial development and test work has been accomplished to prove the performance of the URNB. Selected results are highlighted below to illustrate the unique and beneficial performance of the URNB.

As described in Section 4, the URNB uses a FMFRR as a key element. Reactions in the FMFRR will produce the proper gas composition that, when combined with the FLR products will give optimal BNRR NOx reduction. The URNB is not simply the combination of rich and lean burner free standing flames. This is illustrated by the results in FIG. 19. To evaluate the impact of the FMFRR process on NOx emissions, tests were run where the flame was ignited within the FMFRR and these results were directly compared to cases where the flame was ignited outside of the FMFRR. In this latter case, no reaction was present within the reactor. All other conditions were held fixed.

Test results are displayed in FIG. 19. The graph legend describes the modified fuel, or URNB, case as IN RZ (stabilized inside of the reaction zone) and the unmodified fuel case as OUT RZ (stabilized outside of the reaction zone). As shown, for the 1 MMBtu/hr burner capacity test, NOx production for the unmodified case was over 100% higher than the modified fuel, or URNB, case. At 0.5 MMBtu/hr, the modified fuel case produced 66% higher NOx than the unmodified fuel, or URNB, case. This discontinuity in NOx results, displayed in FIG. 19, clearly confirms that modifying the fuel in the FMFRR reduces NOx more significantly than simple rich and lean flame burner results. Other burners, that do not use this unique feature, should have up to 100% higher NOx emissions for equivalent furnace temperatures. As highlighted in Section 4, this URNB NOx advantage, for a given furnace gas temperature, can be used to improve burner stability margins, improve burner turndown, limit CO and unburned hydrocarbons, and give more burner flexibility to allow retrofits to a wider range of units. These are important advantages to low NOx burner users.

It is clear that reaction in the FMFRR significantly improves NOx performance. It was of interest to investigate the impact on NOx of the fraction of fuel burned in the FMFRR versus the total fuel burned.

Several tests were performed to establish a fuel fraction range for optimal URNB NOx performance. This fuel fraction is defined as the fuel burned in the FMFRR versus the total fuel burned. Results of these tests are displayed in FIG. 20. For these tests, all parameters were fixed except for fuel fraction, in order to ensure comparability of results. Fixed parameters are listed in the legend of FIG. 20. The fuel fraction was varied from 35% to 50%. NOx data were taken for each fuel fraction, at varying furnace temperatures.

As evidenced in FIG. 20, URNB NOx performance was relatively insensitive to changes in fuel fraction. Of the four fuel fractions tested, the 40% fuel fraction was slightly better than the other three cases. This fuel fraction achieved 9 ppm NOx performance at furnace temperatures up to 2050 F. This exceeded the 9 ppm NOx performance of the other cases by nearly 50 F. Prior URNB tests at 0.5 MMBtu/hr scale have also confirmed this fuel fraction performance impact.

As noted earlier, jet geometry governs product gas mixing, peak flame temperature and NOx. Therefore, it is of in interest to determine the impact of jet geometry on burner performance. The impact of both FMFRR fuel rich and FLR fuel lean jet configurations and sizes were of interest.

The URNB was equipped with a 4.5 inch refractory sleeve that allowed the testing of variable FMFRR jet exit inserts. Four different fuel rich jet geometries were tested. These configurations are listed in the table below. The different size and number of jets give varying entrainment rates and exit velocities. This influences burnout flame temperature and Nox.

| Reaction Zone Jet Exit Configurations | | | |
|---|---|---|---|
| Configuration | # of Jets | Jet Size (in) | Center to Center (in) |
| 1 | 1 | 2.375 | NA |
| 2 | 1 | 4.5 | NA |
| 3 | 4 | 1.5 | 3.00 |
| 4 | 4 | 1 | 2.50 |

FIG. 21 displays the results for the variable jet configurations. All other parameters, that were held constant to ensure the comparability of the results, are listed on the figure. Of the four configurations, Configuration 3, with four 1.5 inch jets, produced the best results. This setup achieved sub-9 ppm results at furnace temperatures ranging up to 2100 F. The other three configurations never achieved sub-9 ppm results at the temperature ranges tested. Although Configuration 2 does not include sub-2000 F furnace temperatures, prior testing with this configuration, at 0.5 MMBtu/hr and 1.6 MMBtu/hr, also failed to produce single digit NOx results.

FLR lean jet size is an important parameter in the URNB design. It determines the amount of entrained furnace gas. A change in size can produce significant impacts. FIG. 22 displays NOx dependence on jet size. All parameters held fixed during testing are listed on the figure. For higher temperatures, the 0.7 inch lean jets clearly outperform the larger 1 inch jets. This effect is explained by a known jet entrainment relationship, which states that the mass flow of the furnace gas entrainment is inversely proportional to the diameter of the lean jets. For similar conditions, the 0.7 inch configuration entrains over 40% more furnace gas at a given downstream distance than the 1 inch configuration. This extra furnace gas entrainment enhances flame cooling and reduces NOx. At lower furnace temperatures, cooling effects become less important, and the different jet sizes give similar results.

FIG. 23 normalizes the NOx results of the two different lean jet configurations by plotting them against their predicted adiabatic flame temperatures. The adiabatic flame temperatures are defined by both the amount of gas and the average temperature of the entrained furnace gas. As the graph shows, the two curves merge at higher temperature. This supports the suggestion that the difference in NOx performance between the two configurations at high temperature can be attributed to the different entrainment ratios. This result supports the entrainment based URNB design approach, as well as demonstrates the potential of the URNB to adapt to different combustion environments, or boiler and furnace types, by modifying entrainment or adding cooled flue gas as furnace gas temperature varies.

Based on parameter optimization tests, a final burner geometry and operating parameters were selected. This configuration is listed in the below table and is illustrated in FIG. 24, along with the operating parameters. It should be noted that the 1 inch lean jets were chosen over the 0.7" lean jets, despite the fact that the smaller jets produced lower NOx. This decision was based on limiting burner pressure drop. However, it should be noted that the number of smaller jets could have been increased to achieve the same purpose. Given the scope of the test, the easier to implement 1 inch jets were selected for testing.

Final Phase I URNB Design Parameters

| | |
|---|---|
| Lean Jets | 8–1.0" |
| Rich Jets | 4–1.5" |
| Fuel Fraction | 40% |
| FMFRR Stoichiometry | 0.55 |
| Lean Jet Stoichiometry | 1.55 |

The final design was tested through an 8:1 burner capacity turndown. For all points, CO and UHC emissions were less than 20 ppm. As shown in FIG. 25, the URNB NOx performance is clearly temperature dependent and remains relatively unaffected by increased velocities and turbulence at higher load operation. Sub-9 ppm operation is possible at up to 1950 F. With the 0.7 inch lean jets, this limit could have been extended to nearly 2100 F. As shown by the results in FIG. 25, for furnace temperatures below 1950 F, NOx decreases from 9 ppm to 5 ppm, as load is reduced from 2 MNMtu/hr to 0.25 MMBtu/hr. The very low level of NOx achieved at 1700 F is consistent with the concept that amine type species and NOx are reacting together in the BNRR zone to create very low NOx levels.

The URNB was also operated at different excess air levels, by altering the air flow rate through the lean jets. It was found that, the URNB is insensitive to changes in stack $O_2$ levels. This indicates that the URNB can be operated at 1–2% stack $O_2$, where boiler efficiency is high. This is an additional advantage of the URNB.

The above test results were obtained on a 2 MM Btu/hr burner consistent with commercial boiler scales. Tests were also performed on a 13 MM Btu/hr scaled version of the burner to determine URNB performance at industrial boiler scales. FIG. 26 presents industrial and commercial burner NOx results over a range of loads.

The operability and CO emissions performance of the burner at industrial scale was even better than that achieved by the commercial scale or burner. However, NOx emissions for the industrial scale burner were somewhat higher at full load. This is illustrated in FIG. 26. As shown, NOx emissions for the commercial and industrial scale burner are equal at low load. However, as load is increased, the industrial scale burner NOx emissions diverge from the commercial scale burner results. At the highest load compared, the commercial scale burner NOx emissions are 23 percent lower. This is a substantial difference. It is probable that the lower NOx with the commercial burner is a result of the cooler gas conditions in the BNRR expected with the higher surface-area-to-volume ratio of the commercial scale system. Given the exponential variation of NOx with temperature, a modest change in peak flame temperature could result in the observed variations in NOx. In future burner scaling efforts, the anticipated temperature increase with scale-up will be better accounted for in the burner design.

Higher BNRR temperatures at larger scales and higher load tend to drive up NOx. By inducing a limited amount of Flue Gas Recirculation (FGR) into the air-flow, temperatures can be moderated and NOx reduced. This impact on NOx was tested in the industrial scale burner. FGR is induced in the test burner by simply running a pipe from the stack to the air blower inlet plenum, and controlling the air-flow into the blower. As the blower air inlet is closed, the amount of FGR drawn from the stack is increased. FIG. 27 presents NOx data with and without FGR at high load conditions. As shown, only a 5 percent FGR rate is needed to reduce NOx by 21 percent at full load. Incrementing FGR to 10 percent further reduces NOx. For the 90 percent firing rate condition, NOx is reduced by over 40 percent. Interestingly, the FGR data shows that NOx does not vary as significantly with load as the no FGR case. Therefore, FGR is most effective at high load where NOx is a significant challenge. Given the exponential variation of NOx with temperature in the BNRR, this is expected.

The above discussion and test results clearly show the good NOx control performance of the URNB and how the performance varies with design and operating parameters. Compared to existing very low NOx burner designs, the URNB has superior performance. This is illustrated below.

URNB NOx emissions performance was compared to the NOx performance of a very low NOx surface assisted combustion burner developed by Alzeta and a highly mixed massive FGR very low NOx burner developed by Coen (based on U.S. Pat. No. 5,603,906). URNB and Alzeta burner data were compared at both commercial and industrial scales. The Coen data was only for industrial scale, and therefore, a comparison with URNB performance was only made at industrial scale.

The Coen data was obtained from a NOx performance map that was a composite of data from several tests. Surprisingly, along with the data map, they mention that, at 5 ppm NOx, the burner's region of stable operation is extremely small, requiring an active control system to prevent potential explosions. According to the Coen data map, their stability limit is reached at 47% FGR, which is close to the over 40% FGR required to get less than 5 ppm NOx. In the URNB low NOx approach, massive FGR is not needed to reach low NOx, as illustrated in FIG. 27. Therefore, the URNB does not operate on the edge of stability, as in the case of the Coen burner. Alzeta low NOx burner data with FGR was obtained at Alzeta in a small commercial atmospheric boiler and in a large and lightly loaded 62.5 MM Btu/hr Thermally Enhanced Oil Recovery (TEOR) boiler. The atmospheric boiler data was obtained in a cool system, which is more consistent with the conditions obtained in the 2 MM Btu/hr URNB tests. These results are compared in FIG. 28, at an excess air level of 15 percent. Unfortunately, at 2 MM Btu/hr scale, URNB tests were not run with FGR. Therefore, we cannot compare over a range of FGR levels. However, we applied a model used in designing the URNB and predicting performance with and without FGR. Model results should indicate how URNB performance varies with FGR. A comparison of the data and model results in FIG. 28 shows that the URNB is superior to the Alzeta burner with no FGR, and will probably have better NOx performance with FGR. This was found to also be the case at the larger industrial boiler scale, as shown below. Besides having better NOx performance at any FGR level, the URNB will have a greater flame stability and safety margin at a given NOx level. As shown, the Alzeta burner needs 20% FGR to reach approximately 9 ppm NOx, whereas the URNB only needs 6% FGR. At this level of FGR, URNB burner stability and safety will be excellent. Furthermore, if the FGR is injected downstream into the BNRR and away from the FMFRR, then URNB stability will be as good as a non-FGR case. This is a clear benefit of the multiple reaction zone FMFRR.

For a comparison of the URNB industrial boiler results to Alzeta burner performance, the Alzeta 62.5 MM Btu/hr TEOR boiler data was utilized. Unfortunately, the Alzeta burner NOx data is given as a function of dilution, which is a combination of excess air and FGR. From the available data, it appears that the actual FGR was limited to approximately 30%. With the Alzeta premixed burner, excess air was then used to further lower NOx, with the additional excess air probably improving burner stability. As noted for the Coen burner, it is well known that massive amounts of FGR cause instabilities and potential explosions. Substituting excess air for FGR in premixed burners helps control instabilities. While the specific FGR levels at low NOx levels are not shown, Alzeta indicates that the "equivalent FGR" effect on NOx can be obtained by the following expression:

$$FGR = 1 - \frac{1 + \text{dilution}}{1 + \text{excess air}}$$

where dilution, excess air and FGR are in fractions. Using this relationship with the Alzeta TEOR data, a comparison between URNB, Alzeta and Coen industrial scale burner data at 15% excess air can be created. This comparison is presented in FIG. 29. The URNB data includes induced Flue Gas Recirculation (FGR) as well as forced Flue Gas Recirculation (FGR) data. In the forced FGR case, the FGR was introduced separately near the FLR injectors. This approach gives good results, but is probably not optimal. Also, to illustrate the validity of the URNB performance model and extend URNB results to higher FGR levels, NOx predictions, as well as URNB data, are given in FIG. 29. Data covers cases without FGR, with FGR induced into the combustion air and forced FGR, injected in an annular jet located near the FLR jets. In addition, the URNB data includes a "new design" jet configuration that optimized jet velocities and jet velocity ratios. As shown in FIG. 29, for any level of FGR, the URNB burner NOx results are much lower, than Alzeta and Coen burner results. In addition, to meet a NOx level of 8 ppm, the URNB, Coen and Alzeta burners would require 5%, 31% and 35% FGR, respectively. This increased FGR flow for the Coen and Alzeta burners increases fan and electric power costs relative to the URNB. It is estimated that the Coen and Alzeta burners would require 41% and 50% more blower power, respectively, than the URNB. For a 20 MM Btu/hr boiler, this reduced power requirement translates into approximately $80,000 in URNB blower electricity cost savings over a period of 10 years. This is significant. Importantly, in addition to this cost benefit, the URNB burner does not have to operate at the bounds of stability to achieve the needed very low NOx performance. This should be very important to users concerned about burner operability and safety.

In summary, the URNB has superior performance compared to other very low NOx burners. This is a result of having multiple reaction zones, over which all performance characteristics can be balanced. In addition, with multiple reaction zones, both NOx production and NOx reduction processes can be optimized.

What is claimed:

1. A combustion and emissions control system of apparatus comprising a first reaction chamber, means for injecting into the first reaction chamber fuel and air in amounts which produce a first mixture having a total fuel to air equivalence ratio which is sufficiently greater than one to cause combustion and nitrogenous species decay reactions over a residence time and temperature which are sufficient to produce first combustion products comprising partially oxidized fuel, decayed levels of nitrogenous species, nitrogenous NOx reducing species and nitrogen oxides, a second reaction chamber, means for injecting into the second reaction chamber additional fuel and air in amounts which produce a second mixture having a total fuel to air equivalence ratio which is sufficiently less than one to cause combustion in the mixture over a residence time and low temperature which are sufficient to produce second combustion products mixed with a minimum amount of nitrogen oxides, means for combining the first and second combustion products into a third mixture, and means for generating burnout reactions in the third mixture over a residence time, temperature and oxygen concentrations which are sufficient to complete reaction of any remaining fuel and to promote reaction between nitrogenous reducing species and nitrogen oxides to produce an exhaust with a low amount of nitrogen oxides.

2. A combustion and emissions control system of apparatus as in claim 1 and further comprising a plurality of said first reaction chambers connected in series, a plurality of said second reaction chambers connected in series, and a third reaction chamber containing the burnout reactions, with the first and second reaction chambers being connected to feed into the third reaction chamber.

3. A combustion and emissions control system of apparatus as in claim 1 and further comprising a plurality of said first reaction chambers connected in parallel, a plurality of said second reaction chambers connected in parallel, and a third reaction chamber containing the burnout reactions, with the first and second reaction chambers being connected to feed into the third reaction chamber.

4. A combustion and emissions control system of apparatus as in claim 3 and further comprising a plurality of said third reaction chambers with the first and second reaction chambers being connected to feed into the third reaction chambers.

5. A combustion and emissions control system of apparatus as in claim 1 and further comprising a plurality of said first reaction chambers in which at least one of the first reaction chambers feeds into at least an other of the first reaction chambers, a plurality of said second reaction chamber in which at least one of the second reaction chambers feeds into at least an other of the second reaction chambers, and the other of the first and second reaction chambers feed into the third mixture.

6. A combustion and emissions control system of apparatus as in claim 5 and further comprising a plurality of third reaction chambers each of which contain a portion of said third mixture, and the other of the first and second reaction chambers feed into the third reaction chambers.

7. A combustion and emissions control system of apparatus as in claim 1 in which the equivalence ratio of the first mixture is in the range of 1.3 to 2.0, the residence time of the reactions of the first mixture is greater that 0.01 seconds, the equivalence ratio of the second mixture is in the range of 0.8 to 0.5 and the third mixture has an fuel to air equivalence ratio of less than one.

8. A combustion and emissions control system of apparatus as in claim 7 and further comprising means for controlling the temperature of the burnout reactions in the range of 1,400° F. to 2,600° F.

9. A combustion and emissions control system of apparatus as in claim 1 which further comprises heat transfer apparatus selected from the group consisting of: (1) a heat exchange zone containing the first mixture; (2) a heat exchange zone containing the second mixture; (3) a heat exchange zone containing the burnout reactions; (4) a first heat exchange zone containing the first mixture and a second heat exchange zone containing the second mixture; (5) a first heat exchange zone containing the first mixture and a second heat exchange zone containing the burnout reactions; (6) a first heat exchange zone containing the second mixture and a second heat exchange zone containing the burnout reactions; and (7) a first heat exchange zone containing the first mixture, a second heat exchange zone containing the second mixture and a third exchange zone containing the burnout reactions.

10. A combustion and emissions control system of apparatus as in claim 1 which comprises cooled flue gas injection means selected from the group consisting of: (1) means for injecting cooled flue gas into the first and second chambers and the third mixture; (2) means for injecting cooled flue gas into the first chamber; (3) means for injecting cooled flue gas into the second chamber;(4) means for injecting cooled flue gas into the third mixture; (5) means for injecting cooled flue gas into the first chamber and third mixture; (6) means for injecting cooled flue gas into the second chamber and third mixture; (7) means for injecting cooled flue gas into the first and second chambers.

11. A combustion and emissions control system of apparatus as in claim 1 which comprises heat transfer apparatus selected from the group consisting of: (1) means for exchanging heat in the first chamber; (2) means for exchanging heat in the second chamber; (3) means for exchanging heat in the third mixture; (4) means for exchanging heat in the first and second chambers; (5) means for exchanging heat in the second chamber and third mixture; (6) means for exchanging heat in the first chamber and third mixture; and (7) means for exchanging heat in the first and second chambers and the third mixture.

12. A combustion and emissions control system of apparatus as in claim 1 which comprises apparatus for injecting NOx reducing agent selected from the group consisting of: (1) means for injecting the NOx reducing agent into the first chamber; (2) means for injecting the NOx reducing agent into the second chamber; (3) means for injecting the NOx reducing agent into the third mixture; (4) means for injecting the NOx reducing agent into the first and second chambers; (5) means for injecting the NOx reducing agent into the second chamber and third mixture; (6) means for injecting the NOx reducing agent into the first chamber and third mixture; and (7) means for injecting the NOx reducing agent into the first and second chambers and the third mixture.

13. A combustion and emissions control system of apparatus as in claim 12 in which the NOx reduction agent is selected from the group consisting of ammonia, urea, cyanuric acid, ammonium sulfate, ammonium bisulfate, sulfite, bisulfite, formate, carbonate, bicarbonate, biuret, triuret and ammelide.

14. A combustion and emissions control system of apparatus as in claim 1 which comprises apparatus for injecting supplemental fuel and air selected from the group consisting of: (1) means for injecting the supplemental fuel and air into the first chamber; (2) means for injecting the supplemental fuel and air into the second chamber; (3) means for injecting the supplemental fuel and air into the third mixture; (4) means for injecting the supplemental fuel and air into the first and second chambers; (5) means for injecting the supplemental fuel and air into the second chamber and third mixture; (6) means for injecting the supplemental fuel and air into the first chamber and third mixture; and (7) means for injecting the supplemental fuel and air into the first and second chambers and the third mixture.

15. A combustion and emissions control system of apparatus as in claim 1 which comprises apparatus for controlling burnout temperature selected from the group consisting of means for controlling the temperature in the first chamber, means for controlling a temperature in a second chamber, and means for controlling the temperature in the third mixture.

16. A method of combusting fuel and air to produce products of combustion with low amounts of NOx, comprising the steps of providing a first mixture of fuel and air, combusting the first mixture in a first zone, the first mixture having a total fuel to air equivalence ratio which is sufficiently greater than one to cause the combustion of the first mixture to produce nitrogenous species decay reactions over a residence time and temperature which are sufficient to produce first combustion products comprising partially oxidized fuel, decayed levels of nitrogenous species, nitrogenous NOx reducing species and nitrogen oxides, providing a second mixture of additional fuel and air, combusting the second mixture in a second zone, the second mixture having a total fuel to air equivalence ratio which is sufficiently less than one to cause the combustion of the second mixture to proceed over a residence time and low temperature which are sufficient to produce second combustion products mixed with a minimum amount of nitrogen oxides, combining the first and second combustion products into a third mixture, and causing burnout reactions of the first and second combustion products in the third mixture to proceed over residence time, temperature and oxygen concentrations which are sufficient to complete reaction of any remaining fuel and to promote reaction between nitrogenous reducing species and nitrogen oxides to produce an exhaust with low amounts of nitrogen oxides.

17. A method of combusting fuel and air as in claim 16 and further comprising the step of controlling the temperature of the burnout reactions to be in the range of 1,400° F. to 2,600° F.

18. A method of combusting fuel and air as in claim 17 and further comprising the steps of controlling the equivalence ratio of a first mixture to within the range of 1.3 to 2.0, controlling the residence time of the reaction of the first mixture to greater than 0.1 seconds, controlling the equivalence ratio of a second mixture to within the range of 0.8 to 0.5, and controlling the equivalence ratio of the third mixture to a ratio of less than one.

19. A method of combusting fuel and air as in claim 16 and further comprising the step of adding supplemental fuel and air downstream of the fuel and air provided for the first mixture to promote NOx reduction reactions.

20. A method of combusting fuel and air as in claim 17 in which the burnout temperature controlling step is selected from the group consisting of controlling the temperature in the first zone, controlling the temperature in the second zone, and controlling the temperature of the burnout reactions.

21. A method of combusting fuel and air as in claim 16 and further comprising the step selected from the group consisting of adding a NOx reduction agent to the first zone, adding a NOx reduction agent to the second zone, and adding a NOx reduction agent to the burnout reactions.

22. A method of combusting fuel and air as in claim 20 in which the NOx reduction agent is selected from the group consisting of ammonia, urea, cyanuric acid, ammonium sulfate, ammonium bisulfate, sulfite, bisulfite, formate, carbonate, bicarbonate, biuret, triuret and ammelide.

23. A method of combusting fuel and air as in claim 20 and further comprising the step of adding supplemental fuel and air to the burnout reactions in amounts sufficient to promote reactions between the reduction agent and NOx.

24. A method of combusting fuel and air as in claim 16 and further comprising the step selected from the group consisting of establishing a gas isolation barrier between the first zone and second zone, establishing a gas isolation barrier between the first zone and burnout reactions and establishing a gas isolation barrier between the second zone and burnout reactions.

25. A method of combusting fuel and air as in claim 16 and further comprising the step of providing a plurality of the second reaction zones, and selectively shutting off at least one of the second reaction zones responsive to reduction of the total fuel firing rate to provide a broadened turndown ratio.

26. A method of combusting fuel and air as in claim 16 and further comprising the step of modulating the equivalence ratios of the respective first and second reaction zones toward one responsive to reduction of the total fuel firing rate to provide a broadened turndown ratio.

27. A method of combusting fuel and air as in claim 16 and further comprising the step of directing hot gasses from the primary zone to the second zone to stabilize combustion in the second zone.

28. A method of combusting fuel and air as in claim 16 and further comprising the step of directing hot gasses from the primary and second zones to the third mixture to stabilize combustion in the third mixture.

* * * * *